United States Patent
LeMay et al.

(10) Patent No.: US 7,774,411 B2
(45) Date of Patent: Aug. 10, 2010

(54) SECURE ELECTRONIC MESSAGE TRANSPORT PROTOCOL

(75) Inventors: Michael LeMay, Eau Claire, WI (US); Jack Tan, Eau Claire, WI (US)

(73) Assignee: Wisys Technology Foundation, Inc., Madison, WI (US)

( * ) Notice: Subject to any disclaimer, the term of this patent is extended or adjusted under 35 U.S.C. 154(b) by 1042 days.

(21) Appl. No.: 11/009,399

(22) Filed: Dec. 10, 2004

(65) Prior Publication Data

US 2005/0198170 A1 Sep. 8, 2005

Related U.S. Application Data

(60) Provisional application No. 60/529,184, filed on Dec. 12, 2003.

(51) Int. Cl.
*G06F 15/16* (2006.01)
(52) U.S. Cl. ...................................................... 709/206
(58) Field of Classification Search ................. 709/206, 709/229; 713/151, 152, 155, 171, 150, 190; 726/4, 21; 370/235; 380/277
See application file for complete search history.

(56) References Cited

U.S. PATENT DOCUMENTS

| | | | | | |
|---|---|---|---|---|---|
| 6,088,456 | A * | 7/2000 | McCracken et al. | ......... | 380/259 |
| 6,185,681 | B1 * | 2/2001 | Zizzi | ........................ | 713/165 |
| 6,442,686 | B1 * | 8/2002 | McArdle et al. | ............ | 713/151 |
| 6,615,348 | B1 * | 9/2003 | Gibbs | ........................ | 713/162 |
| 6,760,752 | B1 * | 7/2004 | Liu et al. | .................... | 709/206 |
| 6,904,521 | B1 * | 6/2005 | Jivsov | ........................ | 713/155 |
| 7,146,500 | B2 * | 12/2006 | Hawkins et al. | ............. | 713/176 |
| 7,149,893 | B1 * | 12/2006 | Leonard et al. | ............. | 713/154 |
| 7,210,036 | B2 * | 4/2007 | Luzzatto | ................... | 713/171 |
| 7,263,619 | B1 * | 8/2007 | Kim | ........................... | 713/194 |
| 7,305,545 | B2 * | 12/2007 | Filipi-Martin et al. | ....... | 713/153 |
| 7,325,127 | B2 * | 1/2008 | Olkin et al. | ................. | 713/152 |
| 2002/0087646 | A1 * | 7/2002 | Hickey et al. | .............. | 709/206 |
| 2004/0133775 | A1 * | 7/2004 | Callas et al. | ................ | 713/153 |
| 2004/0148356 | A1 * | 7/2004 | Bishop et al. | .............. | 709/206 |

OTHER PUBLICATIONS

Paul C. Kocher et al., "The SSL Protocol", version 3.0, Transport Layer Security Working Group, 1996. http://wp.netscape.com/eng/ss13/draft302.txt.

(Continued)

*Primary Examiner*—William C Vaughn, Jr.
*Assistant Examiner*—Thomas Richardson
(74) *Attorney, Agent, or Firm*—Boyle Frederickson, S.C.

(57) ABSTRACT

An electronic message transport protocol applies two distinct sub-protocols, a message transport protocol and an encryption key management protocol, which operate in tandem to provide enhanced security. The protocol may employ an existing SMTP infrastructure to transport secure email messages, and a key server implementing the key management protocol to transport key packets associated with the secure email message. However, the protocol need not be limited to email, and may be applicable to other electronic message applications. The message transport protocol permits communicating parties to obscure their identities to enhance security. The key management protocol supports message security, and allows senders to control access to messages even after they have been transmitted. The message transport protocol permits the sender to encrypt the entire message and utilizes the key management protocol for exchange of necessary keys. The message transport protocol relies on a group addressing scheme to obscure individual sender and recipient identities.

20 Claims, 10 Drawing Sheets

OTHER PUBLICATIONS

J. Staddon and B. Kaliski, "PKCS 1: RSA Cryptography Specifications", version 2.0, Network Working Group, RSA Laboratories, 1998. http://www.ietf.org/rfc/rfc2437.txt.

David H. Crocker, "Standard for the Format of ARPA Internet Text Messages" RFC822, University of Delaware, 1982. http://www.faqs.org/rfcs/rfc822.html.

N. Borenstein and N. Freed, "Multipurpose Internet Mail Extensions (MIME) Part One: Format of Internet Message Bodies", RFC2045, Network Working Group, 1996. http://rfc.net/rfc2045.html.

Chris Oakes, "This Email Will Self-Destruct", Wired News, 2000. http://www.wired-vig.wired.com/news/technology/0,1282,3896,00.

Jonathan B. Postel, "Simple Mail Transfer Protocol", RFC 821, Network Working Group, Information Sciences Institute, 1982. http://www.ietf.org/rfc/rfc0821.txt.

R. Rivest, "The MD5 Message-Digest Algorithm", RFC 1321, Network Working Group, 1992. http://www.faqs.org/rfcs/rfc1321.html.

Bruce Schneier, "Description of a New Variable-Length Key, 64-Bit Cipher (Blowfish)", Fast Software Encryption, Cambridge Security Workshop Proceedings, pp. 191-204, 1993. http://www.schneier.com/paper-blowfish-fse.html.

Kenneth J. Withers, "Self-Deleting E-mail: A Self Delusion?", Discovery Edge, 2000. http://www.kenwithers.com/articles/email.html.

J. Galvin et al., "Security Multiparts for MIME: Multipart/Signed and Multipart/Encrypted," RFC 1847, Network Working Group, Oct. 1995. http://www.faqs.org/rfcs/rfc1847.html.

David L. Chaum, "Untraceable Electronic Mail, Return Addresses, and Digital Pseudonyms," Communications of the ACM, vol. 24, No. 2, Feb. 1981, pp. 84-88.

Aviel D. Rubin et al. "Revocation of Unread E-mail in an Untrusted Network," AT&T Research, Computer Science Department, Cambridge, MA, 1997.

* cited by examiner

SECURE ELECTRONIC MESSAGE TRANSPORT PROTOCOL

This application claims the benefit of U.S. provisional application No. 60/529,184, filed Dec. 12, 2003, the entire content of which is incorporated herein by reference.

TECHNICAL FIELD

The invention relates to electronic messaging and, more particularly, to providing secure transmission of electronic messages.

BACKGROUND

Electronic messages, such as email messages, transmitted between a sender and a recipient include information that can be intercepted by third parties. Generally, email messages transmitted and received using simple mail transfer protocol (SMTP) are not secure and face threats from both network intruders and legitimate communicating parties. Various attributes of messages are vulnerable to falsification, interception, and/or modification. Security concerns may arise in a variety of electronic messaging applications, including email and electronic transactions such as online credit card processing.

For example, email message senders may commit return-address forgery and timestamp falsification. Similarly, email message recipients may deceitfully deny receipt of messages. Additionally, network intruders may modify messages to manipulate communications, while network eavesdroppers may passively leech messages to gather confidential information. The information that can be gathered from a compromised message includes items such as the identities of the sender and recipient(s), the actual content of the message, the date the message was sent and any other attributes encoded in the message.

Furthermore, servers used to store and transport email messages can pose threats to message security. Messages can remain in server backup archives long after their intended lifetime has elapsed, only to reemerge at inopportune times. Consequently, after a message has been sent via SMTP and is in transit, in storage on an intermediate SMTP mail server or unopened on the final recipient's machine, the message may be read at will by anyone with access to the message data. Anyone from corporate spies to the email server backup operator may have access to the message data.

When an email transmission is initiated with SMTP, the sender first specifies a reverse path through which delivery of error notifications and replies will be directed by issuing a MAIL FROM command. This information may be falsified, but is typically not falsified so that error notifications may be properly received. When valid information is submitted in this field, however, the identity of the sender is accessible to anyone who intercepts the SMTP traffic related to the delivery of the message. This information may be safely obscured with SMTP, but at the expense of undelivered error notifications.

The next step in transmission requires the sender to specify each recipient with a RCPT TO command. The information should be accurate so that the intended recipient will receive the message. Accordingly, this information generally cannot be obscured by a system based upon SMTP. Therefore, third parties may have ready access to the list of recipients associated with a message.

To complete the final step for transmission, the sender issues the DATA command and sends the actual message data. Additional date and time information may be added to the message. If this data is not securely encrypted, additional information may be revealed to an intruder, possibly including the message content itself.

In addition to security concerns, the sender lacks message control. In particular, the sender tends to have little or no control over a message that has been transmitted once the message has left the sender's machine. Current email systems have achieved the goal of efficiency at the expense of message control services. Messages that are accidentally sent to unintended recipients are dutifully delivered by current transport mechanisms, leaving the sender no recourse to stop delivery. If a sender initially designated a message recipient who she later wants to have no access to a previously sent message, she would have no reasonable means of preventing access to the message.

One of the most serious and obvious breaches of email privacy made possible by flaws inherent in common implementations of SMTP is related to mass-mailings and "spam." With current systems based on the SMTP addressing scheme, in which every message recipient is assigned a unique email address, the only information required to send a message to a user is the email address of the user.

Many of the security vulnerabilities and shortcomings have been addressed to some degree by conventional email security solutions. However, popular formats for encoding information useful to email systems, such as multipurpose internet mail extensions (MIME), may reveal information without giving the uninformed user any indication of that vulnerability.

For example, the popular pretty good privacy (PGP) and secure/MIME (S/MIME) protocols can secure and protect the contents of a message using public key cryptography. However, an eavesdropper may still be able to determine information including the identities of the communicating parties by intercepting conventional cleartext SMTP headers and commands, the most revealing of which cannot be readily obscured using conventional email encryption programs.

Some conventional email security solutions address both message confidentiality and support sender message control. However, these systems normally fulfill their requirements using proprietary software controls, rather than peer-reviewed, open cryptographic controls, while often sacrificing message-flow confidentiality. Still other systems exist that propose to entirely supplant SMTP and its related protocols. Such systems have little chance of wide acceptance even though they may achieve superior security performance.

SUMMARY

In general, the invention is directed to an electronic message protocol that supports secure transport of electronic messages such as email. For convenience, the protocol will be referred to herein as the secure electronic message transport protocol (SETP). The SETP protocol makes use of two distinct sub-protocols, a message transport protocol and an encryption key management protocol, which operate in tandem to provide enhanced security. Both sub-protocols employ cryptography to ensure security. A system employing the SETP protocol may employ an existing SMTP infrastructure to transport secure email messages, and a key server implementing the key management protocol to transport key packets associated with the secure email message.

The message transport protocol permits communicating parties to obscure their identities to enhance security. In addition, the message transport protocol permits the sender to encrypt the entire message and utilizes the key management protocol for exchange of necessary keys. The message transport protocol relies on a group addressing scheme to obscure individual sender and recipient identities.

Unlike conventional electronic message transport protocols that encrypt only the content of a message, the SETP protocol encrypts the entire message, including the content of the message, and message flow control information. Flow control information may include the receiver and sender fields, date information, and other sensitive information.

The key management protocol supports message security, and allows senders to control access to messages even after they have been transmitted. In particular, the key management protocol is used to transport key packets associated with the message and operates indirectly between communicating parties using a key server that mediates key packet transfer.

The group addressing scheme utilized by the SETP protocol allows several email users to share a single transport-level email address and mailbox. Although an email message is directed to a group, only an intended recipient is permitted to view the email message by virtue of possession of the appropriate key. Conversely, an individual user can reliably retrieve his own messages from the group mailbox while being restricted from compromising messages destined for other users. As a result, email messages may securely and reliably transport information while providing privacy, data origin authentication, data integrity, non-repudiation, and message flow confidentiality.

In addition, the key management protocol may permit the sender to issue commands to control the lifetime of a message that has already been sent, and receive status information for a previously transmitted message to provide proof-of-delivery. For example, message access can be denied using the key management protocol by invalidating a key necessary to obtain the group-addressed email message. In particular, a sender may specify key lifetimes, and interact with the key server to issue one or more commands to the key server to send a message key, retrieve a message key, delete a message key, or return key status.

In one embodiment, the invention provides a method comprising encrypting flow control information associated with an electronic message, the flow control information including identities of a sender and an intended recipient, and transmitting the electronic message with the encrypted flow control information from the sender to a recipient group mailbox accessible by the intended recipient.

In another embodiment, the invention provides a system comprising a sender client that generates an electronic message and encrypts flow control information associated with the electronic message, a recipient client that receives the electronic message, wherein the flow control information includes identities of the sender client and the recipient client, one or more message transport servers that receive the electronic message with the encrypted flow control information from the sender client, and a recipient group mailbox accessible by the recipient client that receives the electronic message with the encrypted flow control information from the message transport servers.

In a further embodiment, the invention provides a method comprising generating a symmetric message key, encrypting an electronic message using the symmetric message key, encrypting the symmetric message key using a public asymmetric key associated with a recipient of the electronic message, transmitting the encrypted message key to a key server, formulating a message header, encrypting the header using the public asymmetric key associated with the recipient, and attaching the encrypted header to the message.

In an added embodiment, the invention provides a method comprising encrypting flow control information associated with an electronic message, the flow control information including identities of a sender and an intended recipient, encrypting a symmetric message key using a public asymmetric key associated with a recipient of the electronic message, transmitting the encrypted symmetric message key to a key server, formulating a message header including an identification of the key server, and transmitting the electronic message with the encrypted flow control information and the message header from the sender to a recipient group mailbox accessible by the intended recipient.

In a further embodiment, the invention provides a method comprising receiving an electronic message encrypted with a symmetric message key, wherein the electronic message includes a message header encrypted with a public asymmetric key associated with a recipient, decrypting the header using a private asymmetric key associated with the recipient, identifying a key server based on an identification in the header, accessing the key server to retrieve the symmetric message key, and decrypting the electronic message using the symmetric message key.

In an added embodiment, the invention provides a method comprising formulating a message header comprising private flow control information including an identification of a key server, identification of a group associated with a sender and an indirect identification of an intended recipient, encrypting the private flow control information, encrypting a symmetric message key using a public asymmetric key associated with the recipient of the electronic message, transmitting the encrypted symmetric message key to a key server, generating a time stamp indicating a time at which the key server receives the encrypted message key, and transmitting the electronic message with the encrypted private flow control information and the message header from the sender to a group mailbox accessible by the intended recipient.

In another embodiment, the invention provides a method comprising encrypting flow control information associated with an electronic message, the flow control information including identities of a sender and an intended recipient, encrypting a symmetric message key using a public asymmetric key associated with a recipient of the electronic message, transmitting the encrypted symmetric message key to a key server, generating a time stamp indicating a time at which the key server receives the encrypted message key, and transmitting the electronic message with the encrypted flow control information from the sender to a recipient group mailbox accessible by the intended recipient.

In a further embodiment, the invention provides a method comprising encrypted an electronic message to obscure content of the electronic message, a sender, and a recipient, exchanging the encrypted electronic message between the sender and the recipient using group mail addresses associated with the sender and the recipient, and exchanging a key to decrypt the encrypted electronic message between the sender and the recipient via an intermediate key server.

Computer-readable media comprising instructions to cause a processor to execute any of the methods described herein are also contemplated.

The invention may provide a number of advantages. For example, in various embodiments, the SETP protocol described herein may be implemented to provide one or more of the following advantages: message privacy, data origin authentication, data integrity, non-repudiation, proof-of-delivery, message flow confidentiality, and message lifetime control. Notably, such advantages can be obtained without the need to supplant or significantly modify existing SMTP infrastructure. For example, the SETP system may be easily integrated with the existing SMTP by simply installing client-side plug-ins. Consequently, the SETP system may efficiently enable secure electronic message transport in a cost effective manner without the need to entirely supplant SMTP.

Message privacy ensures that only the intended recipient is able to read the message contents. Data origin authentication ensures that sender group identity and message timestamps cannot be easily forged. Data integrity permits corrupted and altered messages to be easily and reliably detected. Non-repudiation makes it difficult or impossible for a sender to deny sending a message. Proof-of-delivery assures the sender that the recipient received the message. Message flow confidentiality makes it difficult for network entities other than the sender and intended recipient to corroborate correspondence between the sender and intended recipient, e.g., by obscuring sender and recipient identities in email messages. Message lifetime control may permit unread messages to be given a strict lifetime with both a starting date and length of time available, or possibly an absolute expiration date.

In some cases, the SETP protocol also may be effective as an anti-spam counter-measure. In particular, the SETP system may reduce the amount of mass emails or "spam" received by a user. Unlike emails protocols that do not encrypt the entire message, the SETP system requires mass mailers to obtain the public key and current address of each targeted recipient, thus forcing the mailer to encrypt the message. As a result, mass mailers are required to allocate computing resources not currently required by SMTP, thereby increasing the cost of operation to mass mailers and reducing the efficiency of existing mechanisms used to disseminate spam.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
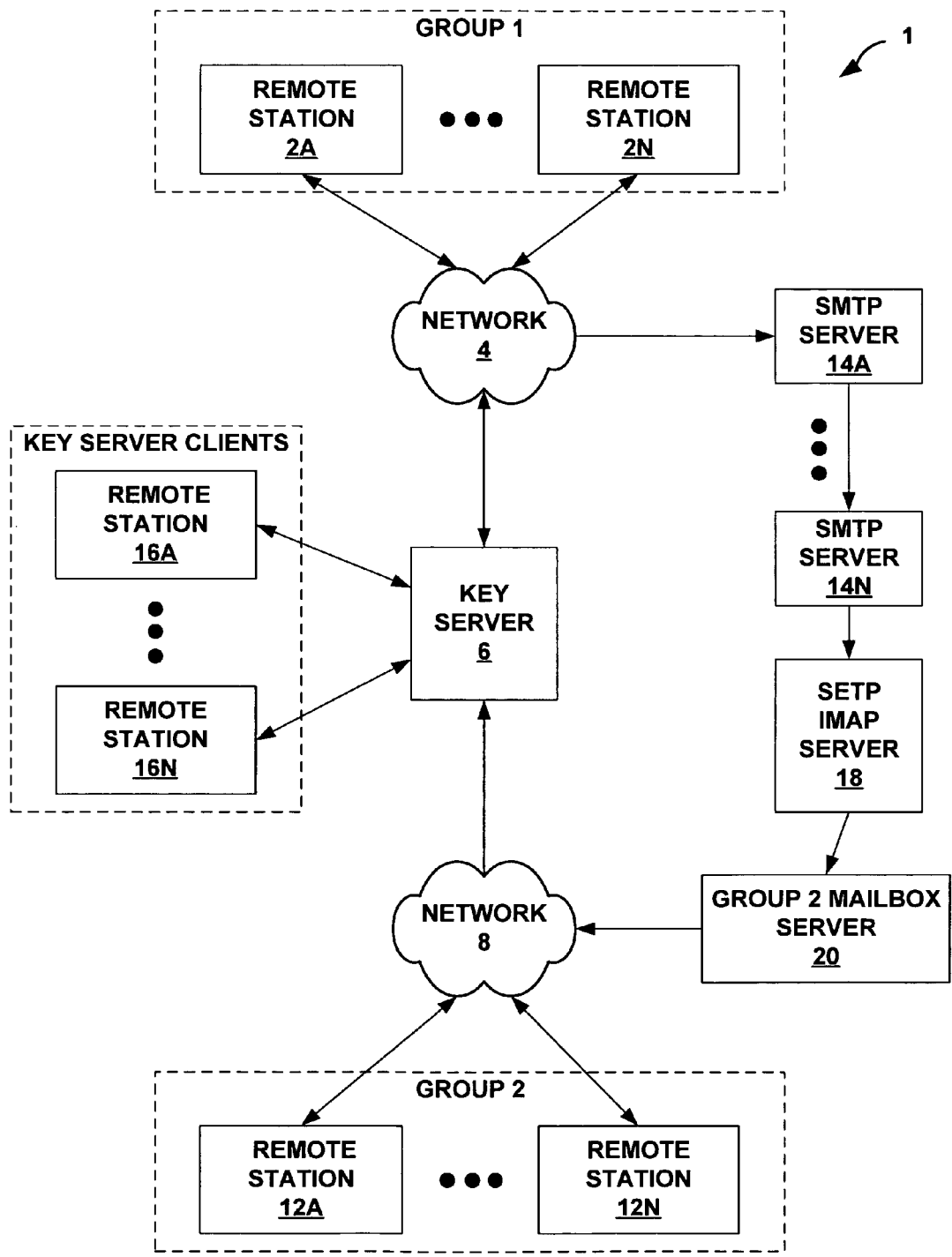
FIG. 1 is a block diagram illustrating a secure electronic message transport protocol (SETP) system that securely transports SMTP email messages in accordance with the invention.

As described in detail herein, the SETP protocol employs a message transport protocol and an encryption key management protocol to provide enhanced security for electronic messages, such as email messages. In the following description, email is specifically referenced to promote a helpful description of the SETP protocol. However, other applications that involve electronic messaging, such as diverse electronic transactions, including online credit card transactions, may benefit from the SETP protocol in accordance with the invention. Accordingly, although email applications are described herein for purposes of illustration, this description should not be considered limiting in terms of the use of the SETP protocol in applications other then email.

The message transport protocol in the SETP protocol can be used in conjunction with SMTP or other electronic message transport protocols and allows communicating parties to obscure their identities and prevent third party access to the communication. The data formats related to the message transport protocol and the key management protocol seek to secure all communication and minimize dependence on trusted third-party systems, as well as conserve network bandwidth.

A system that implements the SETP message transport protocol may be configured to encrypt the entire electronic message, including the content of the message and flow control information such as the receiver and sender fields, date information, and other sensitive information, using a public key cryptography technique, such as RSA. Hence, the flow control information, including the receiver and sender fields, and content of the message is concealed. The identities of the sender and recipient are obscured primarily by changing the method by which they address each other. In particular, the message transport protocol requires transportation of the message using a group addressing scheme, rather than an addressing scheme that relies on individual email addresses.

The group addressing scheme allows several users to share a group mailbox and a single transport-level email address. Consequently, network eavesdroppers and even SMTP and mailbox servers directly involved in message transport see only group email addresses when routing and storing messages. However, distribution of keys enables each individual user to reliably retrieve his own messages from the group mailbox while being restricted from compromising messages destined for other users.

By encrypting the entire message and utilizing group addressing and a key management protocol, the SETP system simply and efficiently mitigates security vulnerabilities inherent in conventional electronic messages schemes such as SMTP. As a result, the SETP protocol can be effective in protecting the privacy of parties using the Internet or other public networks as a communication medium and provide other parties currently wary of Internet communication with a platform that can reliably protect the privacy of its users.

According to the SETP key management protocol, key packets associated with the message are transported to recipients. In one example, a system that implements the key management protocol may utilize a public key infrastructure (PKI) to distribute keys between users. In particular, a symmetric message key used to encrypt the message is encrypted with a recipient's public key and entrusted to a key server. The same symmetric encryption key is used to both encrypt and decrypt data. Therefore, the recipient must possess the symmetric message key in order to decrypt the message obtained by the group mailbox.

Hence, by controlling the symmetric message key according to the key management protocol, the sender can control which individual recipient(s) is able to access the message. In addition, by selectively invalidating the symmetric message key, or specifying a time during which the key can be used, the sender can effectively control the lifetime of a message. Once a key is invalidated, either explicitly or by expiration of a time interval, a recipient is no longer able to access the message using the key. In this manner, the sender "owns" the message until the recipient has received it and successfully decrypted it.

As described herein, dialogue involved in both the message transport protocol and the key management protocol generally assumes that a secure, trusted channel has been established and that the group identity of the user has been established. The Secure Sockets Layer (SSL) or transport layer security (TLS) protocol may be used to establish these properties A system implementing the SETP protocol securely and reliably transports an email message by encrypting the entire message using asymmetric encryption and digital signature techniques, transporting the message according to standard SMTP, and transporting key packets associated with the message in accordance with the key management protocol. The message digest of the cleartext message is signed using the sender's private key and the message is encrypted using a symmetric message key.

The symmetric message key is then transmitted to the key server by the sender and later retrieved by the recipient when attempting to download a message from the recipient's group mailbox. Prior to transmitting the symmetric message key to the key server from the sender, the symmetric message key is encrypted using the recipient's public key. Thus, the key server does not have access to the actual key data necessary to determine the content of the message or any other sensitive information such as the recipient's individual identity. Furthermore, by controlling the symmetric message key, the sender can effectively recall messages that have previously been sent and control the lifetime of a message.

Additionally, in some embodiments, the intermediate key server may be used to acquire and return certified timestamps to the sender upon receiving a key packet from the sender. The key packet may be certified by the key server as well as other parties in communication with the key server at that time. Thus, each timestamp is certified by a number of entities rather than a single trusted entity, thereby enabling non-repudiation. Moreover, the sender may issue commands to the key server to control the lifetime of the message and check the status of a key.

To retrieve a message, a recipient retrieves all messages in his group mailbox and inspects the headers of each message. Alternatively, a recipient may initially retrieve only message headers. In either case, a user determines which messages are destined for it by attempting to decrypt the header of each message using the recipient's private key and verifying the signature using the sender's group private key. The header is formulated at the sender side using a corresponding public key associated with the recipient. If decryption is successful, the recipient knows that the message was intended for it, and may then establish a connection with the key server and request the symmetric message key to decrypt the message contents.

In the event that the sender has not yet made the symmetric message key available or the symmetric message key has expired, the key server informs the recipient accordingly. If the symmetric message key is available, however, the key server transmits the encrypted symmetric message key to the recipient. The recipient may then successfully decrypt the entire message and read its contents. The individual identity of the sender can be determined from the "From:" field in the cleartext message. The integrity of the cleartext message can be verified using the signed message digest included in the header. Entity authentication may be performed simultaneously and the timestamps may also be decrypted and inspected.

FIG. 1 is a block diagram illustrating a system 1 that implements the SETP protocol, in accordance with an embodiment of the invention, to securely and reliably transport email messages generated by a member of group 1 to a selected member of group 2. As shown in FIG. 1, system 1 includes remote stations 2A-2N, network 4, key server 6, network 8, remote stations 12A-12N, SMTP servers 14A-14N, remote stations 16A-16N, SETP IMAP server 18 and group 2 mailbox server 20, all of which will be described in detail below.

Remote stations 2A-2N ("remote stations 2") are clients associated with individual users, which may be senders or recipients of electronic messages. System 1 allows a user associated with one of remote stations 2A-2N ("remote stations 2") to transport an email message to a selected user associated with one of remote stations 1 2A-12N ("remote stations 12"). In this example, remote stations 2 are associated with users belonging to group 1 and remote stations 12 are associated with users belonging to group 2. The terms "sender" and "recipient" refer to remote stations 2 or 12 associated with users sending and receiving messages, respectively.

A remote station 2 or 12 may take the form of any computing device incorporating support for electronic messaging, such as an email application. Examples include desktop and portable computers, personal digital assistants, mobile telephones, Internet appliances, and the like. Hence, remote stations 2 operate as email client devices, while users associated with the remote stations are persons having email accounts served by such client devices. Remote stations 2 execute email applications that are configured, or modified by plug-ins, to implement the functionality described herein. Networks 4 and 8 may be any local area network, wide area network, or global network such as the Internet.

Although system 1 is illustrated as transporting secure emails from the users of group 1 to the users of group 2, system 1 may comprise multiple groups of users capable of transmitting secure emails to any user associated one of the multiple groups. In other words, system 1 may support multiple groups of users and any user may transport a secure email message to any other user. For example, a user associated with group 2 may likewise send a secure email message to a user associated with group 1. Also, a user associated with group 1 may transport a secure email message to a different user associated with group 1.

Hence, users within different groups or the same group may send secure email messages to one another. For ease of illustration, however, SETP system 1 is described herein as transporting a secure email message generated by a user associated with remote station 2A to a user associated with remote station 12A. The user associated with remote station 2A may be referred to herein as "the sender" while the user associated with remote station 12A may be referred to as "the recipient."

Generally, system 1 provides the sender with control over a message until the recipient has received and successfully decrypted the message and enables message privacy, as well as data origin authentication, data integrity, non-repudiation, proof-of-delivery, message flow confidentiality, and message lifetime control. As described above, system 1 provides these security features by encrypting the entire message using a form of public key cryptography and employing group addressing along with a key management protocol to manage public and private keys associated with group 1 and 2, each of remote stations 2 and 12, and intermediate key server 6.

Although system 1 utilizes group addressing to allow each of the users belonging to a group to share the same transport-level email address and group mailbox, each user also has a traditional individual email address. The users associated with group 1 share the same transport-level group email address and the users associated with group 2 share a different transport-level group email address. A group may comprise any logical group and include any number of users.

For example, group 1 may comprise a subnet of users and assign the subnet of users the email address groupA@msn.com. As a further example, group 2 may comprise a subnet of users sharing the email address group10347001@yahoo.com. In any case, the users associated with a group share the same transport-level email address while retaining their traditional individual email addresses. Key server 6 may be identified in a manner similar to individual users, since key servers also may be associated with multiple groups. The individual and group email addresses also may serve as entity identifications to allow lookup of an entity's certificate and other information in lightweight directory access protocol (LDAP) directories.

An important distinction is to be made between the group identity and individual identity of a user. The individual identity of the user is obscured, as has been noted above. However, it is not necessary to protect the group identity of a user, as this is well known to everyone concerned with the user's communications. Group mail server 20 verifies the group identity of the user, however, to provide security for the group's messages.

The transport-level email address shared by the users associated with a group may be transparent to the users. For example, the sender may simply enter the individual email address of the recipient, e.g., AAA@yahoo.com using a standard email client. System 1 then maps the individual email address of the recipient to the group email address assigned to the recipient, e.g., 10374001@yahoo.com.

In some embodiments, system 1 may communicate with a LDAP directory (not shown) that stores individual email addresses and corresponding group email address for each individual email address. System 1 may communicate with a different LDAP directory (not shown) that stores group email addresses and a public key associated with each group email address. Using the LDAP directories, individual email addresses may be mapped to group email addresses.

Yet another LDAP directory (not shown) may store the uniform resource locator (URL) associated with a sender's key server 6, to permit the recipient to establish a connection with the key server. In particular, inclusion of the sender's group email address in the message header may permit the key server information to be looked up in the LDAP directory, so that a recipient can determine which key server to access for key retrieval. In each case, communication with the LDAP directory can be carried out by an email client application, e.g., as modified by a plug-in module to implement the SETP protocol.

Also, in some embodiments, remote stations 2 and 12 may communicate with a public key infrastructure (PKI) (not shown) to distribute keys between users. As an example, remote stations 2 and 12 may communicate with a PKI provided by certificate providers such as Thawte or Verisign. Each user's public key may be well known to parties that desire to communicate with the user, while the user's private key is known only to the user in accordance with public key cryptography. In addition, each group 1, 2 has a corresponding group and private key.

When a sender prepares to send a message, the email client on the remote station 2 associated with the sender encrypts the entire message, including the content of the message and flow control information such as the receiver and sender fields, date information, and other sensitive information. The sender signs the message digest of the cleartext message using the sender's private key and encrypts the message using a symmetric message key. The symmetric message key is then encrypted using the recipient's public key so that only the recipient can use the symmetric message key, upon retrieving that key from key server 6, as will be described. By controlling the status of the symmetric message key, the sender can effectively recall messages that have previously been sent and enforce mandatory read receipts for messages.

The sender controls the symmetric key by entrusting the encrypted symmetric message key to key server 6. Notably, key server 6 does not have access to the actual key data necessary to determine the content of the message or any other sensitive information such as the recipient's identity. Key server 6 acquires and returns certified timestamps to the sender upon receiving the key packet and a time stamp, signed using the sender's private key (herein "self-signed time stamp"), from the sender.

Key server 6 certifies the received self-signed time stamp by signing the enclosed time specification with its own private key. In addition, key server 6 may transmit the certified time stamp to remote stations 16A-16N that are currently in communication with key server 6. Remote stations 16A-16N are clients associated with individual users and are referred to herein as key server clients 16. For ease of illustration, key server clients 16 are illustrated as a separate group from remote stations 12 and remote stations 16. However, key server clients 16 may comprise any user in communication with key server 6 during a time period in which key server 6 acquires certified time stamps as described herein.

For example, the users associated with remote stations 2N and 12N may be included in key server clients 16 provided remote stations 2N and 12N are in communication with key server 6 during the time period in which key server 6 acquires certified time stamps. Notably, key server clients 16 is not a static group as the users in communication with key server 6 vary over a given time period. In any case, key server clients 16 sign the certified time stamp with their own private keys to provide an added layer of time stamp certification, corroborating the timestamp provided by key server 6. In particular, each time stamp is certified by a number of entities rather than a single trusted entity thereby enabling non-repudiation.

The sender then generates a header to be attached to the message that is used by a recipient to determine if the message was intended for the recipient. The header is encrypted using the recipient's public key and included in the final message addressed to the recipient's group mailbox and marked as originating from the sender's group mailbox (not shown). The final message is transmitted to any of SMTP servers 14A-14N (SMTP servers 14) on which the sender has privileges. SMTP servers 14 operate as message transport servers between the sender and recipient. The final message is transported between SMTP servers 14 in accordance with standard protocol until it reaches the recipient's group mailbox, at group 2 mailbox server 20. Although SMTP servers 14 provide message transport in this example, message transport may be achieved by other message transport protocols.

A remote station 12 retrieves the final message by retrieving all messages in the pertinent group mailbox at group 2 mailbox server 20 and inspecting the headers of each message. The remote station 12 determines which messages are destined for the individual user by attempting to decrypt the header of each message using the user's private key and verifying the signature using the sender's group private key. Again, the header is encrypted by the sender using the recipient's public key. Accordingly, successful decryption of the header using the recipient's corresponding private key indicates that the message was indeed intended for the respective recipient. When the remote station 12 associated with the recipient determines that a message was intended for the associated user, the remote station may then establish a connection with the key server 6 and request the symmetric message key so that the entire message may be decrypted by the recipient.

Allowing unauthorized users to access the group's mailbox can also create extra security risks. The data in the mailbox is theoretically secure no matter how it is accessed, but it is a good principle to provide intruders with as little assistance and access as is possible. Once the user has been authenticated in a particular group, the user is authorized to execute commands on the group's data and to access the group's mailbox.

Thus, several users sharing a single group mailbox watch for new messages and attempt to read every message that is delivered to the common mailbox. As mentioned above, however, the messages are constructed such that only the authorized recipient within the group will be able to successfully read the message. The other users will simply detect that the message is not destined for them and discard it as meaningless data. However, this initial scanning of the mailbox will be a function of the email client installed on the applicable remote station 12, and will be generally invisible to the user, avoiding annoyance.

The sender's key server 6 allows the sender to issue commands for controlling key storage lifetime and checking the status of key in addition to storing and forwarding keys to recipients. In particular, the sender may issue a command to the key server 6 to set the lifetime of a key as well as specify the absolute time at which the lifetime of the key begins or ends. Hence, the key management protocol may supply commands to support a few basic operations: sending a key from the sender to the key server, retrieving a key from the key server for use by a recipient, checking the status of a previously sent key, and deleting or invalidating a previously sent key. Additionally, the key server 6 may notify the sender when a key is downloaded by a recipient by sending a message to the sender's group mailbox (not shown).

In the event that the sender has not yet made the symmetric message key available or the symmetric message key has expired, key server 6 informs the recipient accordingly. However, if the symmetric message key is available, the key server 6 transmits the encrypted symmetric message key to the recipient. With the symmetric message key, the remote station 12 associated with the recipient may then successfully decrypt the message and read its contents. The individual identity of the sender can be determined from the "From:" field in the cleartext message and the integrity of the cleartext message can be verified using the signed message digest included in the header. Entity authentication may be performed simultaneously and the timestamps may also be decrypted and inspected.

In the illustrated embodiment, remote stations 12 share a group mailbox stored within group 2 mailbox server 20. As examples, group 2 mailbox server 20 may comprise one or more Internet message access protocol (IMAP) servers, post office protocol (POP) servers, or mail user agents (MUAs). Network eavesdroppers see only group email addresses, not individual user email addresses.

Likewise, even the SMTP servers 14A-14N ("SMTP servers 14") and mailbox server 20 directly involved in message transport see only group email addresses when routing and storing messages, thus ensuring message flow confidentiality. By using SETP techniques that employ asymmetric encryption and digital signatures, the only entity able to determine the destination of a particular message is the intended recipient.

Importantly, no special requirement is placed upon networks 4 and 8 used to transport messages and other data necessary for protocol execution. Networks 4 and 8 may comprise any type of network including the Internet, satellite, wireless, packet radio, Ethernet, ATM, DSL, and any other network capable of transporting electronic messages from one of remote stations 2 to one or more of remote stations 12. Remote stations 12 and 14 may execute conventional email client software along with a plug-in that enables the SETP techniques described herein.

However, creating a loose, dynamic binding between senders and the Internet Protocol (IP) addresses of remote stations 2 may provide greater message flow confidentiality when networks 4 or 8 comprise the Internet or any other IP-based network by rendering traffic analysis more difficult. A properly configured dynamic host configuration protocol (DHCP) server may create a loose binding between hosts and their addresses. Alternatively, anonymous routing such as that provided by Onion routing may increase the difficulty of traffic analysis, but is not necessary for the system to operate and maintain security and privacy.

Advantageously, as shown in FIG. 1, system 1 can transfer secured email message bodies using an existing infrastructure of SMTP servers 14A-14N ("SMTP servers 14") along with SETP IMAP server 18. In some embodiments, SETP IMAP server 18 may be configured for SETP so that it is accessible only through a limited form of IMAP. The SETP IMAP server may have all of its mailbox modification commands disabled to prevent users, such as users associated with remote stations 12, from accidentally or maliciously destroying messages intended for other members.

SETP IMAP server 18 may establish policies to limit message storage lifetimes since messages can never be deleted by group members. For example, group 2 mailbox server 20 may delete old messages when the host disk is nearly full, or place explicit lifetimes on incoming messages so that all messages more than a predetermined number of days old are deleted.

To further increase message storage efficiency in conjunction with the message storage lifetime policy, messages may be deleted after they have been downloaded a predetermined number of times, with that number being based upon the number of members in the group served. In any case, it may be advisable for recipients within system 10 to check their group mailbox frequently so as not to lose incoming mail. However, even if a message is destroyed before the intended recipient downloads it, the sender may notice that the message key was never downloaded and may resend the message.

In addition, group 2 mailbox server 20 may require an enhanced form of IMAP TLS client authentication that would deny any entity not in possession of the current group private key access to the group mailbox. Requiring client authentication may be desirable to give external cryptanalysts as little material as possible to analyze. Furthermore, it may be advantageous to integrate unsolicited commercial email (UCE) or "spam" reduction measures into SMTP servers 14.

For example, SMTP servers 14 may be enhanced to pre-screen messages entering group 2 mailbox server 20 by rejecting messages not formatted for SETP, i.e., as valid SETP messages with appropriate header. In other words, SETP system 1 may provide "security by obscurity" by eliminating all conventional UCE intended for standard email programs. In addition, SMTP servers 14 may screen domain and group names against community UCE databases.

System 1 may provide further advantages over conventional electronic message transport protocols by requiring mass mailers to obtain the public key and current address of each targeted recipient thus forcing the mailer to encrypt messages. As a result, mass mailers are required to allocate computing resources not currently required, thereby greatly increasing the cost of operation to mass mailers and decreasing the efficiency of established spam generation mechanisms.

In any case, as described herein, system 1 simply and efficiently mitigates security vulnerabilities inherent in SMTP by encrypting the entire message and utilizing group addressing and a key management protocol. As a result, SETP system 1 may provide message privacy, data origin authentication, data integrity, and non-repudiation as well as proof-of-delivery, message flow confidentiality, and message lifetime control.

Furthermore, a tradeoff between security and efficiency may be selected. For example, in order to improve efficiency, a recipient may select to initially retrieve only the headers of all the messages stored within the group mailbox, rather than the entire messages themselves. Instead, the recipient may retrieve the entire message only after determining, by successful header decryption, that the message is intended for the user rather than retrieving the entire message when initially connecting with the group mailbox. In this case, the user may issue a get mail command, accompanied by a list of messages marked for further inspection. The group mailbox server 20 then responds with the bodies for the marked messages.

In some embodiments, the number of users associated with a group sharing the same transport-level email address and group mailbox may be decreased in order to increase efficiency. Alternatively, the number of users associated with the group may be increased in order to improve security. Moreover, the SETP system may be easily integrated with SMTP by simply installing client plug-ins. Consequently, the SETP system may efficiently enable secure electronic message transport in a cost effective manner.

Figure 2:
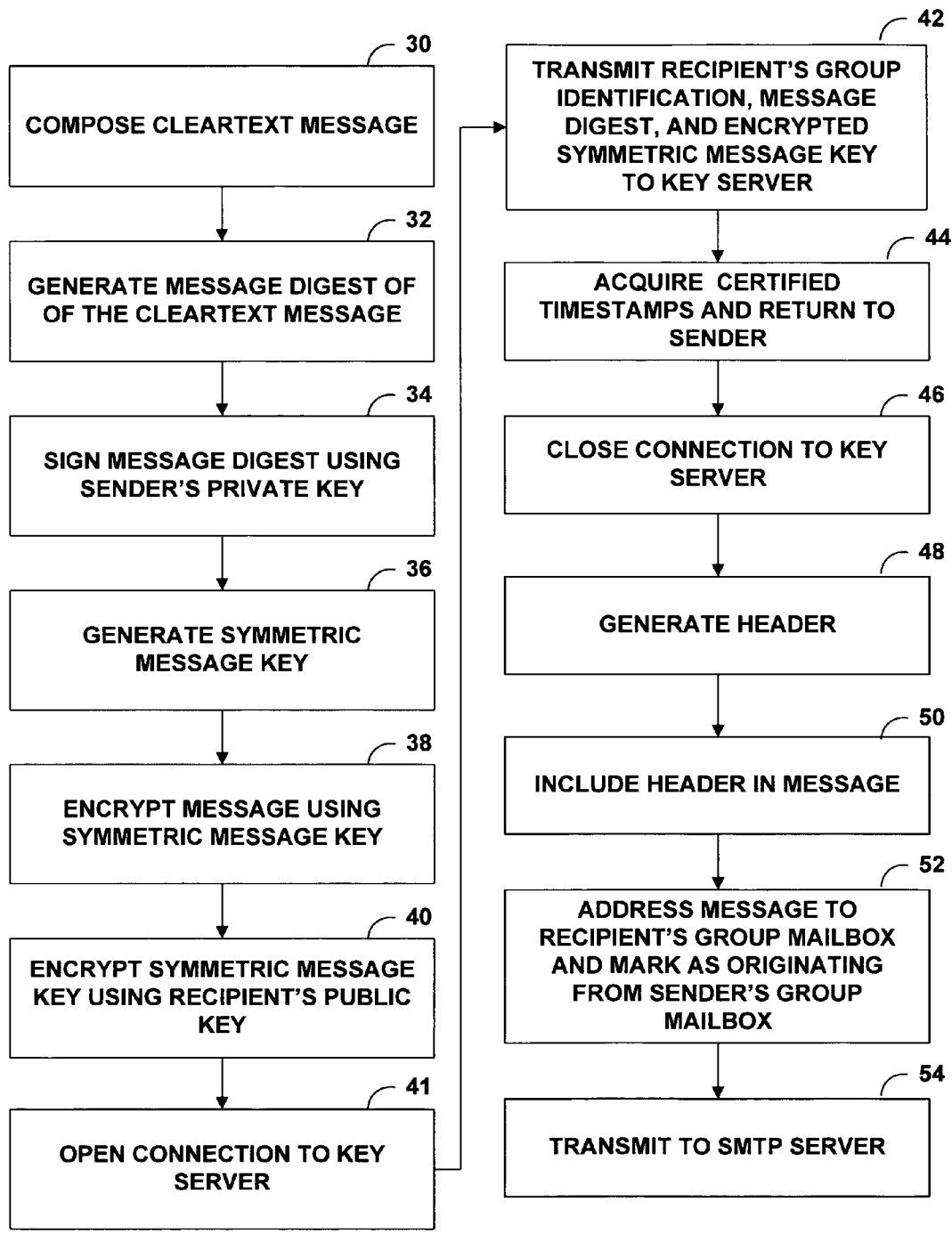
FIG. 2 is a flowchart illustrating exemplary operation of the SETP system of FIG. 1 for transmission of a secure email message from a sender to a recipient.

FIG. 2 is a flowchart illustrating exemplary operation of system 1 of FIG. 1 in greater detail. In particular, FIG. 2 illustrates various operations involved in transporting a secure email message from a user associated with group 1, i.e. the sender, to a user associated with group 2, i.e. the recipient, according to the SETP protocol. As shown in FIG. 2, initially, the sender composes a cleartext message (30) to be securely transmitted using standard formatting suitable for consumption by the intended recipient. For example, the message may be formatted using the standard multipurpose internet mail extensions (MIME) inside an RFC 822 message so that standard email clients can open and interpret the cleartext message.

Importantly, there need not be any special restrictions on the formatting except that the "From:" field should be populated with the sender's individual email address to allow the recipient to verify the signature attached to the message. It may be advantageous that a recipient does not accept messages that are missing the "From:" field, since the integrity of the message cannot be verified in those cases. MIME messages may be compressed, if desired, by using GZIP, to obscure size information, decrease network bandwidth usage and increase mailbox server storage efficiency. The reason for not encrypting the message before compressing it is that encrypting a message also reduces the redundancy in a message, which make it non-compressible.

The sender then generates a message digest or hash of the cleartext message (32) and signs the message digest using the sender's private key (34). The message digest may be generated by passing the compressed message through a message digest algorithm such as the standard MD5 message digest algorithm to generate a unique bit of binary data, i.e. the message digest or hash, representing the compressed message. This data is then signed using the sender's individual private key.

The digest itself does not reveal any useful information about the data from which it was generated, and it is very difficult to find two distinct messages that reduce to the same digest. The digitally signed message digest is saved for later use and used by the recipient to verify the integrity of the message and provide data origin authentication and non-repudiation using digital signatures. This signed hash value is saved for later use.

Next, the sender generates a symmetric message key (36) that will be used to encrypt the entire cleartext message. A high-quality random or pseudo-random number generator can be used for this purpose. The sender then encrypts the message using the symmetric message key (38). In some embodiments, the Blowfish symmetric encryption algorithm may be used to encrypt the symmetric message key. Key length may be determined differently for each application, depending on the requirements of the application.

The intended recipient must possess the symmetric key before being able to decrypt the message. Thus, by controlling dissemination of the symmetric message key, the sender can control access to the message. For example, by controlling the validity of the symmetric message key, the sender can effectively recall messages that have already been sent and enforce mandatory read receipts on messages. Moreover, the symmetric message key is encrypted using the intended recipient's public key (40) so that only the recipient can use the symmetric message key.

To control the symmetric message key, the sender entrusts the symmetric message key to the sender's key server 6 (FIG. 1) by opening a connection to the key server (41). When a user opens a connection with a key server 6, the user must be authenticated into the user's claimed group. The connection may be a secure, mutually-authenticated SSL or TLS connection to the key server 6. The TLS protocol may operate with PKI.

The key server 6 must authenticate itself against its well known certificate while the key server will likewise obtain the user's claimed group certificate and the user will verify itself against the certificate. Importantly, the sender is only authenticated to the key server 6 as being part of the sender's group. Accordingly, the sender's individual identity is obscured, even to the key server 6. If the authentication step fails, the connection between the sending remote station 2 and key server 6 is terminated.

Importantly, group private and public keys are used as the basis for group authentication. While access to a group's private key is restricted to actual members of the group, it may also be possible for a user to change membership among groups. Moreover, group keys may be periodically updated to increase security. Notably, key server 6 never has access to the actual key data necessary to determine the content of a message, nor any other privileged information such as the recipient's individual identity.

In order to allow easy authentication of group members, the current group public key should be widely known and trusted. However, to ensure secure authentication, the current group private key should be known only by valid group members. The group public and private keys should be easy to change and the change should not adversely impact the performance of any protocol or cause denial-of-service (DoS) for legitimate protocol participants.

In order to allow easy authentication of group members and ensure secure authentication, the key server 6 manages group public and private keys in accordance with the key management protocol and may be used as a key certification authority for the group's public key. In alternative embodiments, system 1 may use external certification authorities. For example, an LDAP directory may be used to store the group key so that the key is readily accessible. The LDAP entry for the group may be maintained automatically by the key server when group membership changes occur.

LDAP is a good solution for key data distribution in an email system, since it is already widely used in organizational directories and can support key data distribution. The inetOrgPerson LDAP object class can be used to store information about an email user, including email address in the mail attribute and PKCS#12 certificate in the userPKCS12 attribute. Individual users would set the mail attribute to individual email addresses, while entries representing email groups would have the mail attribute set to the group email address. The key server could be responsible for updating the group's information.

The standard certificationAuthority object class contains a CACertificate attribute that can be used to publish the certification authority's certificate. Also, since the key server may serve as a group's certificate authority, the key server can be represented by an applicationEntity entry with the presentationAddress attribute set to the key server's Internet address. A certificationAuthority entry can be attached, since certificationAuthority is an auxiliary object class.

One issue that arises relates to member expulsion from a group. To expel a member, the group must replace its shared keyring. If the old key was used to generate message data that is still in transit, the new group keyring will fail to decrypt that data. To avoid this problem, the group's LDAP entry may maintain a multi-valued userPKCS12 attribute containing all keys that could possibly be in use. This allows any user requiring access to the old certificate to retrieve it from the entry.

In any case, a mutually-authenticated secure channel is first established between the key server 6 and a group member to securely transfer the current group private key to the group member. It is important to note that this will ordinarily be the only situation in which a group member may be authenticated according to his individual identity rather than his group identity. Next, the key server 6 transfers the private key data to the member.

For group key pair generation, each group is associated with a certificate and corresponding key used to authenticate group members and encrypt messages for the group. This pair is generated and distributed as necessary by the group's key server. The key server publishes the group public key in the appropriate directory. The group private key is only distributed to valid group members. The key server authenticates group members individually and transmits the current group private key to them in a dedicated session.

The key management protocol described herein allows the key server 6 to easily manage group membership and periodic key updates by simply replacing the group's keys and refusing service to members possessing the old key until the member switches to the new key. For example, adding a member to a group requires adding the new group member's identification to the key server's group registry. The new member may then be granted all privileges associated with group membership, including access to the group private key.

If a member were removed from the group, however, the new key would not be distributed to that member, thereby effectively denying all privileges in system 1 designed exclusively for group members. In the event that a group member is removed from the group or a key must be refreshed for other reasons, the group's key server 6 must generate a new private and public key pair to be used by the group. Generating a new private and public key invalidates the old public and private key. This key switch affects protocols in progress that depend upon the group key. For that reason, the old key may be retained for a reasonable amount of time.

Hence, it is possible for a legitimate user to fail authentication because the user does not possess the most recent group key. In this case, the user may request the current group key from the group's key server by establishing a connection and authenticating himself with his individual key and then issuing a command to retrieve the current group key. The command may be represented like any other command to the key server, e.g., as a 32-bit binary constant. The particular constant transmitted for this function may be referred to as "KEYS_CMD_RETR_GRP_KEY." Next, the user transmits the string representation of the group's transport-level address. The string may be transmitted in the same format that is used to store it in the message header.

Upon receiving the command and string, the key server 6 searches the group's membership records for the user. If key server 6 is able to locate the user, the key server transmits a copy of the current group private key to the user, e.g., in PKCS#12 (Personal Information Exchange Syntax) format. Ordinarily, it will not be necessary to encrypt the group private key because it is being transferred via a mutually-authenticated, encrypted channel.

If user lookup fails, the key server 6 may return a failure message, e.g., "KEYS_STAT_KEY_NOT_FND," and promptly disconnect the user. Upon receiving the group private key, the user is automatically disconnected and may reconnect using the newly acquired key to disassociate his individual identity from activities to be conducted via the key server 6. In any case, sender group authentication is required to allow the key server 6 to restrict resource usage and to restrict later administrative access to uploaded keys.

With further reference to FIG. 2, after the connection has been established with the key server (41), the sender (remote station 2) transmits the recipient's group identification in the form of the individual, transport-level email address, the message digest of the cleartext message signed with the sender's private key, and the symmetric message key encrypted with the intended recipient's public key (42) so that only the intended recipient can use the symmetric message key. An asymmetric key encapsulation mechanism with a symmetric data encapsulation mechanism (KEM-DEM) may be used to allow efficient encryption of large message keys.

In order to upload the symmetric message key to the key server 6, the sender may first transmit a key upload command, referred to as "KEYS_CMD_UPLOAD_KEY," to initiate the key upload. Second, the sender transmits the recipient's group identification, formatted as a binary ASCII string, the recipient's group identification followed by the message digest signed with the sender's private key, and a symmetric message key encrypted with the recipient's public encryption key. If the symmetric message key is successfully stored, the key server 6 returns a success code, e.g., "KEYS_STAT_SUCCESS." Otherwise, the key server 6 returns a failure code, e.g., "KEYS_STAT_KEY_EXISTS,"

to indicate that the uploaded key conflicts with another key already stored in the database maintained by key server 6.

Next, as shown in FIG. 2, the key server 6 acquires certified timestamps and returns the certified timestamps to the sender (44). When the certified timestamps have been acquired and returned to the sender, the connection to the key server is closed (46) and the sender generates a header (48) to be attached to the final message packet. The header may include the sender's group identification, the identification for the key server 6 storing the symmetric message key, the cleartext message digest signed with the sender's private key, and a copy of the message digest signed using both the sender's private key and the sender's group's private key. The header will allow verification and decryption of the SETP message by the intended recipient.

The data that is inserted into the binary header may be formed by storing the length of the string in bytes in a network-byte-order 32-bit field, followed by an ASCII string representing the sender's group identification. Following that, a similarly-formatted string should be included containing the entity ID for the key server that will be used to store the message key. This is necessary so that the recipient can look up the key server's Internet address as well as its certificate.

Two interrelated message hashes can be appended to complete the message header data. The first hash is the sender-signed hash of the compressed message. Then, that hash is signed using the sender's group private key and appended to the data. Every hash that is included in the header is represented as binary data, and its actual data is preceded by a network-byte-order 32-bit field specifying the length of the data. To close the message header, the previously assembled binary data is processed by a hashing algorithm and the resultant hash is prepended to the message header. Finally, the header can be encrypted with the recipient's individual certificate using a KEM-DEM scheme, as provided by the encryption toolkit in use.

The signed cleartext hash value is copied and also signed with the sender's group's private key to prevent widespread denial of service (DoS) attacks on the group's key server 6, which could be instigated by senders outside the group. Senders outside the group could otherwise forge message headers pointing to the group's key server since message keys are typically stored on a key server dedicated to the sender's group. If a recipient opens a message from one group pointing to a key server controlled by another group, a recipient remote terminal 12 may be configured to avoid immediate connection to the key server to avoid a potential distributed DoS attack by the sender. Cross-group key storage need not be forbidden by the SETP protocol, but it may be identified as an abnormal usage pattern.

In any case, the header is then encrypted using the recipient's public key. In addition, a hash value over the previously encrypted header may be pre-pended to prime the encryption algorithm and provide efficient header verification. The resultant header is then included in the new MIME message (50). The message is then addressed to the recipient's group mailbox and marked as originating from the sender's group mailbox (52).

The message may be formatted in three logical sections. The first may be a section comprising the previously generated message header, i.e. the header signed using the recipient's public key. The second section may comprise the main ciphertext, while the third section may comprise a timestamp section including another ciphertext, encrypted under the same key as the main ciphertext, that comprises the collection of certified timestamps acquired by the key server 6. The second and third section may both be encrypted using the symmetric message key. In some embodiments, the standard "multipart/encrypted" message format specified in J. Galvin et al., "RFC1847—Security Multiparts for MIME: Multipart/Signed and Multipart/Encrypted," http://www.ietf.org/rfc/rfc1847.txt, Oct. 1995, may be used to format the final message.

The final message is then transmitted to any SMTP server (54) on which the sender has privileges, thereby taking advantage of the existing SMTP infrastructure. The final message is transported between SMTP servers in the standard fashion until it reaches the recipient's group mailbox, where it may be retrieved by the intended recipient.

Figure 3:
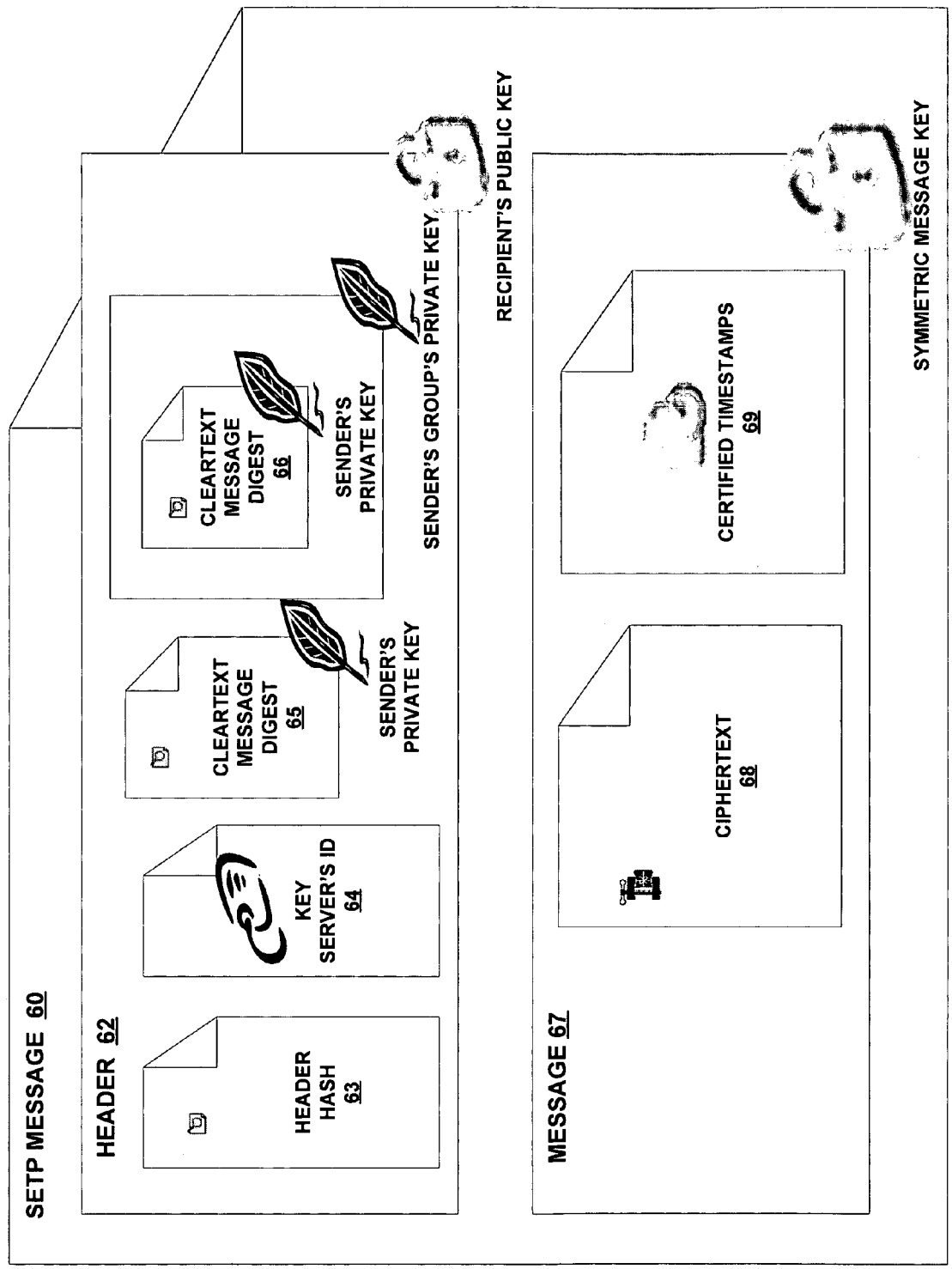
FIG. 3 is a conceptual diagram illustrating an exemplary SETP email message.

FIG. 3 is a conceptual diagram illustrating an exemplary SETP email message 60 that includes a header section 62 signed using the recipient's public key and a message section 67 signed using the symmetric message key. Header 62 includes a header hash value 63 used to prime the encryption algorithm, a key server identification 64, a cleartext message digest signed using the sender's private key 65, and a copy of the cleartext message digest signed using the sender's private key as well as using the sender's group's private key 66. Message 67 further includes ciphertext 68 and certified timestamps 68.

After the symmetric message key has been successfully uploaded to the key server, the sender can generate message 60 and transmit message 60 to an SMTP server 14. Message 60 may be formatted using a variation on the MIME multipart/encrypted security extension as described in the previously mentioned paper authored by J. Galvin et al. For example, the standard MIME header fields may be populated as follows:

From: sender's identification
Date: omitted from the message; the certified timestamps attached to the message are used instead
To: identification of the recipient's group
MIME-Version: 1.0 (SETP 1.0)
Content-Type: multipart/encrypted; protocol="application/setp"

The rest of message 60 is organized as header 62 and message 67. Header 62 is designated for control information needed by the encryption protocol. The control information for the SETP protocol takes the form of a specialized message header. Message 67 contains the ciphertext of the message. This ciphertext is encrypted using the symmetric message key and encoded as specified in the MIME section header. The ciphertext actually may contain a ciphertext of both the actual message, and the timestamp section.

Figure 4A:
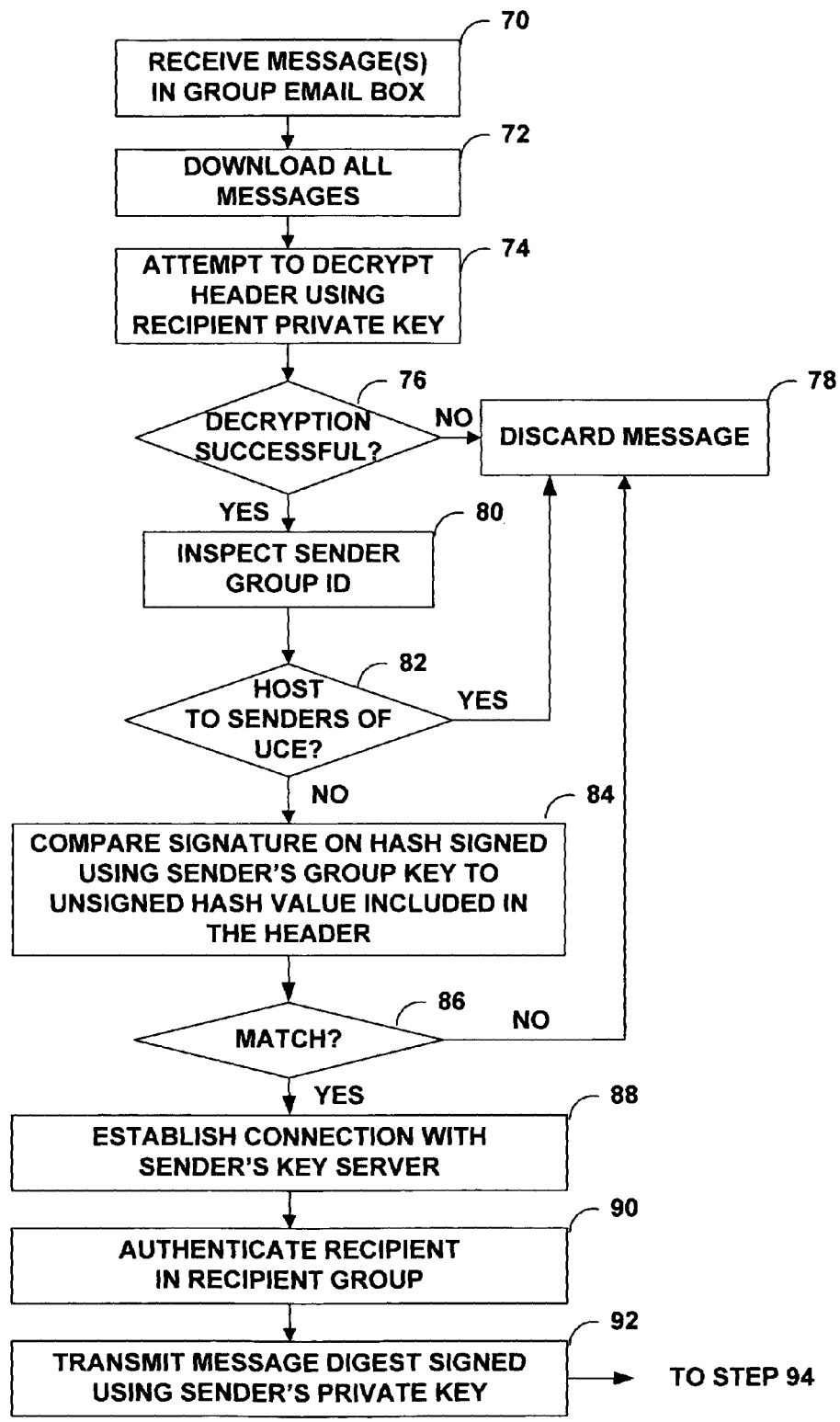
FIGS. 4A and 4B are flowcharts illustrating exemplary operation of the SETP system for retrieving a secure email message.
Figure 4B:
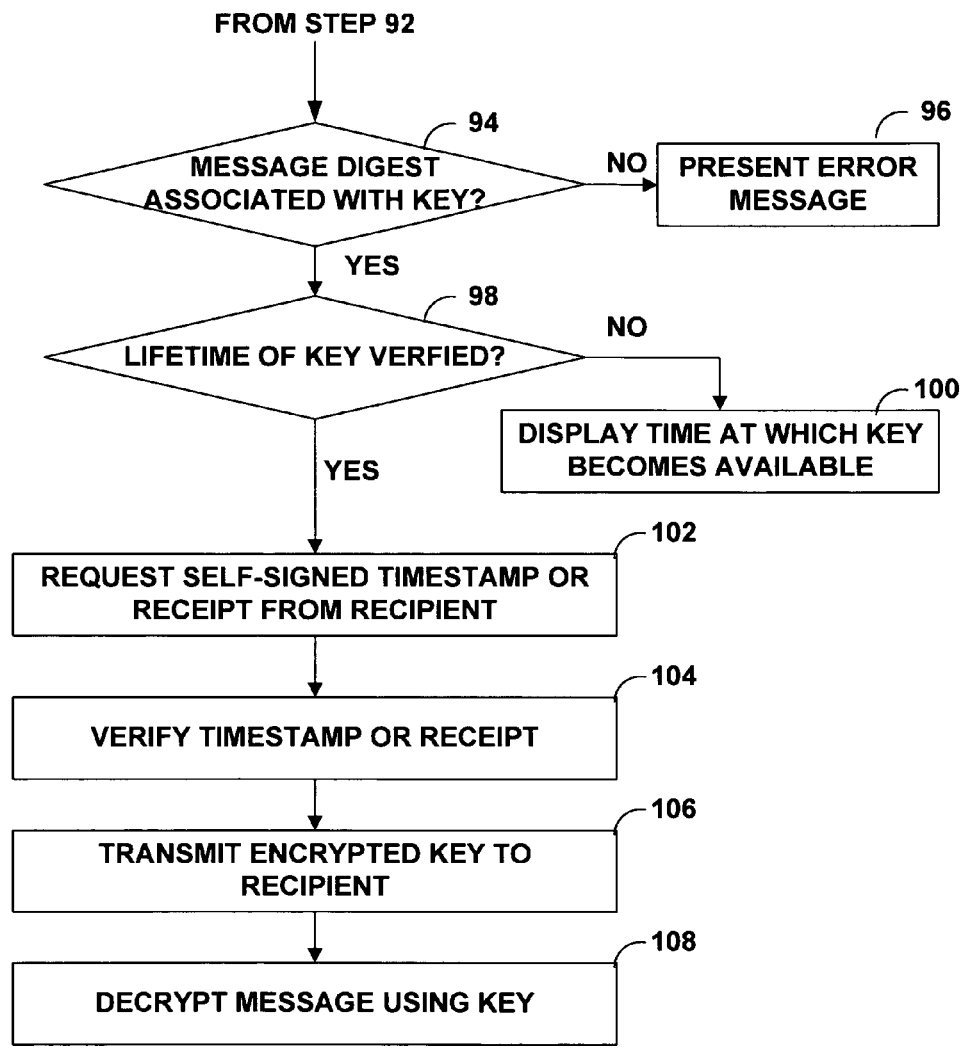

The message may be formed this way because the multipart/encrypted content-type prescribes exactly two MIME sections. The encrypted MIME message is of type multipart/parallel and includes two sections, ciphertext 68 and certified timestamps 69. Ciphertext 68 comprises a Content-Type of message/rfc822 and includes the actual message. Certified timestamps 69 include the ciphertext of the timestamps associated with the message and may comprise multiple timestamps. Thus, certified timestamps 69 have a Content-Type of multipart/parallel. The first timestamp may be the stamp that was certified by the key server 6. The remaining timestamps are timestamps certified by key server clients, such as remote stations 16 (FIG. 1), for added corroboration of the timestamp issued by key server 6. FIGS. 4A and 4B are flowcharts illustrating exemplary operation of system 1 in retrieving a secure email message from group 2 mailbox server 20. Certain conditions are established when a user subscribes to a group and is provided access by the administrator of group 2 mailbox server 20. The user is securely provided with a copy of a public key unique to the group. The group 2 mailbox server 20 keeps the group's corresponding private key as a secret. The new group member is also provided with a unique secret (symmetric) key and personal ID, which the group 2 mailbox server 20 has generated and also knows.

The same symmetric encryption key can be used to both encrypt and decrypt data. Symmetric encryption keys are primarily useful in situations where key confidentiality can be ensured and high processing speed is necessary. The existence of these keys is vital to the success and security of the protocols and it is assumed that they are existent. It is also assumed that these keys are available only to the properly authorized entities.

Only the group members and group servers should know the current group private key. Every user will also have an asymmetric key pair that is used to make a shared group mailbox feasible. The public key in this pair should be well known to parties wishing to communicate with the user, while the private key in this pair should be known only to the member.

Initially, a message is received in group 2 mailbox server 20 (70) from an SMTP IMAP server 18 (FIG. 1). The recipient downloads all the stored messages (72), e.g., by issuing a "list mail" command, accompanied by an identifier for the last message previously received by the recipient. The group 2 mailbox server 20 responds with a list of messages, which may be empty.

The group 2 mailbox server 20 may make use of existing IMAP mailbox servers and MUAs having functionality as described previously. An SETP-aware MUA may be provided to decode the raw MIME messages and pass them to a SETP reception subsystem. In some embodiments, the messages in group 2 mailbox server 20 may be assigned identifying numbers that increase sequentially by increments of one and are ordered according to the arrival time of the messages. Additionally, the recipient may scan the message stored on group 2 mailbox server 20 for all available messages that have not yet been inspected and download those messages.

Regardless of the number of headers or messages downloaded, the recipient inspects each secure message header (74) by attempting to decrypt the header using its private key. The first step taken by the SETP recipient is to inspect the first section present in the message. If it is a multipart section, the recipient immediately knows that the message is part of a bulk mailing. Otherwise, it knows that the message is individually addressed to himself.

Again, if network bandwidth is significantly limited, it may be advantageous to initially download only message headers rather than the entire message. However, this approach may compromise privacy as group 2 mailbox server 20 may be able to determine which message a recipient actually received by examining the recipient's request to retrieve the corresponding message body. Accordingly, if bandwidth is not a concern, it may be more desirable to download all messages, rather than just headers.

In either case, the recipient determines if the decryption of a message header is successful (76) by hashing the trailing header values using the same algorithm as that originally used by the sender and verifying this value against the hash in the message header. If the values do not match, the recipient simply discards the message (78). The downloading of headers or messages, attempted decryption of message headers, and discarding of messages that cannot be decrypted may be completely invisible to a user. Rather, the user may only see those email messages actually intended for the user as a recipient.

If the hash values do match, the recipient inspects the group identification revealed in the header (80) to determine if the sender's group has been marked by other recipients as being a host to senders of UCE (82), as will be described below. In any case, if the sender's group has been marked by other recipients as being a host to senders of UCE, the message is discarded (78). In the event that the recipient verifies the signature on the hash signed using the sender's group key, the recipient compares the result to the unsigned hash included in the header (84) and determines if the hashes match (86). If the hash values do not match, the recipient assumes that the message was corrupted or destined for another group member and discards the message (78). Otherwise, the recipient can successfully decrypt the header and is in possession of the information required to retrieve the symmetric message key associated with the message from the key server.

To retrieve the key, the recipient establishes a connection with the sender's key server (88), which is identified by information in the decrypted header, such as a URL. In particular, the recipient obtains the key server entity identification from the message header, and looks up the corresponding Internet address and certificate in the appropriate LDAP directory.

The recipient establishes a secure, i.e. mutually authenticated, connection with the sender's key 'server using the key server's ID provided in the decrypted message header, which authenticates the recipient into the recipients group (90). To initiate the download of a message key from the key server, the recipient sends a command, such as "KEYS_CMD_DN-LOAD_KEY," over the secure connection to the key server. The recipient may then upload the information associated with the message key from the key server.

First, the cleartext message digest signed using the sender's private key is transmitted to the key server (92). The key server then determines if the message digest is associated with a key (94). If the referenced message key cannot be located, the key server returns a failure response code, e.g., "KEYS_STAT_KEY_NOT_FND." In this case, the recipient receives an error message (96) indicating that the key was incorrectly identified or was recalled by the sender. If the message digest is associated with a key (94), the key server 6 may then determine if the lifetime of the key is verified (98).

If the key was correctly identified but has not yet entered its sender-specified lifetime, the key server 6 returns a response code, e.g., "KEYS_STAT_KEY_NOT_LIVE," and indicates the time at which the key will become alive (100). If, on the other hand, this is the first time the key has been accessed, the key server may request a self-signed timestamp or receipt from the recipient (102) certifying the download. If there is no key associated with the message digest presented by the recipient, the key server informs the recipient that the message received was most likely corrupted in transit or recalled by the server. To indicate the request for the self-signed timestamp, the key server may return a code, e.g., "KEYS_STAT_RECPT," to which the recipient may respond with the sender-signed message hash appended to the current time, and signed with the recipient's group's private key.

The key server 6 may then verify the timestamp or receipt (104) or, alternatively, if the key has been downloaded before, the key server transmits the encrypted key to the recipient (106). Key server 6 returns the success code KEYS_STAT_SUCCESS and transmits the encrypted key to the recipient (106). If receipt validation fails, key server 6 retransmits the code KEYS_STAT_RECPT to indicate the failure. Otherwise, to complete the transaction, the key server returns the requested message key data.

When the symmetric message key is successfully acquired, the recipient can decrypt the message using the key (108), and decompress the actual message body and read its contents, as well as the obscured flow control information. This information can be presented to the user in a transparent fashion such that the user is generally unaware of the operation of the SETP protocol. The individual identity of the sender can be determined from the From: field in the cleartext message. The integrity of the cleartext message can be verified using the signed message digest from the header. Entity authentication may be performed simultaneously and the timestamp section may also be decrypted and inspected.

When the message key download succeeds, as indicated above, the recipient proceeds to decrypt the message key and continue with the protocol. The next step is to actually decrypt the message body (second MIME part). After this completes, the message body is verified against the message digest included in the message header. If the integrity check succeeds, the recipient decrypts the timestamp section in a similar fashion.

Once both sections have been decrypted, any number of the timestamps are inspected and verified, if desired, and both sections of the message are returned to the MUA for further processing. Most MUAs do not include a method for displaying multiple timestamps. For this reasons, information about the timestamps may be included by modifying the message content before it is returned to the MUA or by extending the MUA to display such information.

If the recipient determines that the cleartext message is uncorrupted, authentic and contains UCE, the recipient may notify other users of the risk associated with processing mail from the sender's group. For example, system 1 may allow each recipient to evaluate the contents of uncorrupted and authentic messages it receives and deems to contain UCE. To communicate the evaluation to other recipients, the recipient may create a specially formatted and signed warning message, and post the message in a specialized LDAP directory.

The specially formatted evaluation message may serve as a review or rating, and may include information about the entity being rated, whether it is an individual sender, a group, or an entire domain, information about why the message was determined to be UCE, and how much of a risk the reviewer believes the rated entity poses in the future. UCE may be objectionable for several reasons. A particular entity or group of entities may be prone to sending improperly formatted messages, causing inconvenient computational burden on message recipients, or the cleartext contents of the message may contain objectionable material, as it is conventionally recognized in current systems.

In exemplary embodiments, each reviewer may have one outstanding review of any particular entity at a time. Furthermore, the reviewer may rescind their own reviews by creating signed, unforgeable recall messages that can be sent to the bulletin boards and other recipients originally notified of the review. In addition, users may submit positive reviews of the party to prevent a malicious review from sabotaging an innocent party's communications. These reviews simply notify other users that the reviewer has received good (non-UCE) email from the reviewed party.

Even negative reviews with varying degrees of risk ratings can balance each other out. In this manner, system 1 may present a fair and reasonable guide to a particular party's actions. Moreover, recipients may be given the option of filtering incoming messages based on the sender's domain, group and individual identities, as each is revealed, by consulting a community rating server when a message is downloaded. Consequently, the recipient may have total control over which advisories are heeded. The community rating server may be updated by recipients that receive UCE.

Several advantages are inherent in the "add-on" nature of system 1 in controlling spam. For example, existing email transport systems are not required to be replaced, upgraded or reconfigured. The spam control scheme described above may also be supplemented when necessary by Bayesian or other filters present in the email recipient's client software. In some cases, if desired, SMTP or IMAP servers could be enhanced to perform preliminary screening of messages using this scheme, and discard messages from marked groups or domains. This approach ordinarily would require consent from all users served by those servers. It also may be beneficial in certain cases to supplement existing UCE control systems, such as Penny Black, with the built-in UCE control mechanisms that can be provided by SETP.

In some embodiments, a certificate may be generated to identify and rate offending UCE material. When an email recipient detects UCE, for example, the recipient generates a certificate describing the offending material. The certificate may be designed to allow multiple attributes of the offending message to be rated, and for the certificate to be associated with a number of entities of varying granularity.

The first entry in the certificate content may contain the number of entities, minus one, rated by the certificate. Some redundancy is eliminated in this way since one is the minimum number of entities. This entry may be a 16-bit unsigned value. The next entry in the certificate contains the entity identification for each entity being rated. Each identification may be encoded as a null-terminated ASCII string. Following these identifiers, a relative risk factor is encoded as a signed, 2's-complement 8-bit integer in network byte-order. The risk factor may be very positive (always transmits useful messages), positive (usually transmits useful messages), near zero (useful messages and UCE are transmitted in equal proportions), negative (usually transmits UCE, but may occasionally transmit useful messages), or very negative (always transmits UCE).

All certificates except those containing a perfectly positive risk rating also may contain specific information about the types of UCE transmitted by the rated entity. A number of codes may be defined to represent various categories and degrees of content. Any number of these codes may be concatenated together. The codes may be formatted as null-terminated character strings. To terminate the certificate, a final null character may be appended to the last character of the actual certificate. If any rating codes are included in the certificate, the last two characters in the certificate are nulls. The entire certificate is signed using the rater's private signature key to provide accountability. Then, this signed value is concatenated onto the rater's identification.

Rating certificates may be uploaded to a centralized LDAP repository, perhaps being stored in a specialized object class specifically designed to store UCE-rating certificates keyed by user and group email addresses. To revoke a certificate, the originator creates a message containing the identities of the entities whose ratings should be revoked. This list should be signed by the rater and the result should be concatenated after the rater's identification. The originator should then be allowed to post this revocation certificate alongside the original rating certificate in the repository (directory).

Although senders of UCE usually rely on mass mailing, senders of UCE are not the only mass mailers. Senders may use mailing lists to allow many communities to efficiently communicate among themselves. Accordingly, SETP may be configured to provide mailing list support. Implementation of SETP in system 1 may permit a user to reduce the expense of sending a secure message to more than one recipient by using a single symmetric message key to encrypt the message destined for the multiple recipients. For example, a message intended for multiple recipients may be formatted as previously described. However, the symmetric message key may be encrypted using the intended recipient's group's public key, rather than any individual's public key. The symmetric message key may then be uploaded to the server once for each group.

Next, a message may be prepared for each intended recipient's group with each message being formatted with multiple headers for each distinct recipient. When each recipient receives the common message, the recipient may attempt to decrypt each header in sequence until it discovers the only one that is valid for that particular recipient. Upon determining which header is intended for the recipient, the recipient may follow the previously described steps to retrieve the symmetric message key from the key server 6 and decrypt the message using the retrieved key. Therefore, a user may selectively tradeoff security by using a single message key multiple times in order to more efficiently transmit message to multiple recipients. This may be particularly advantageous when transporting mass mailings that do not require a high level of security.

Figure 5:
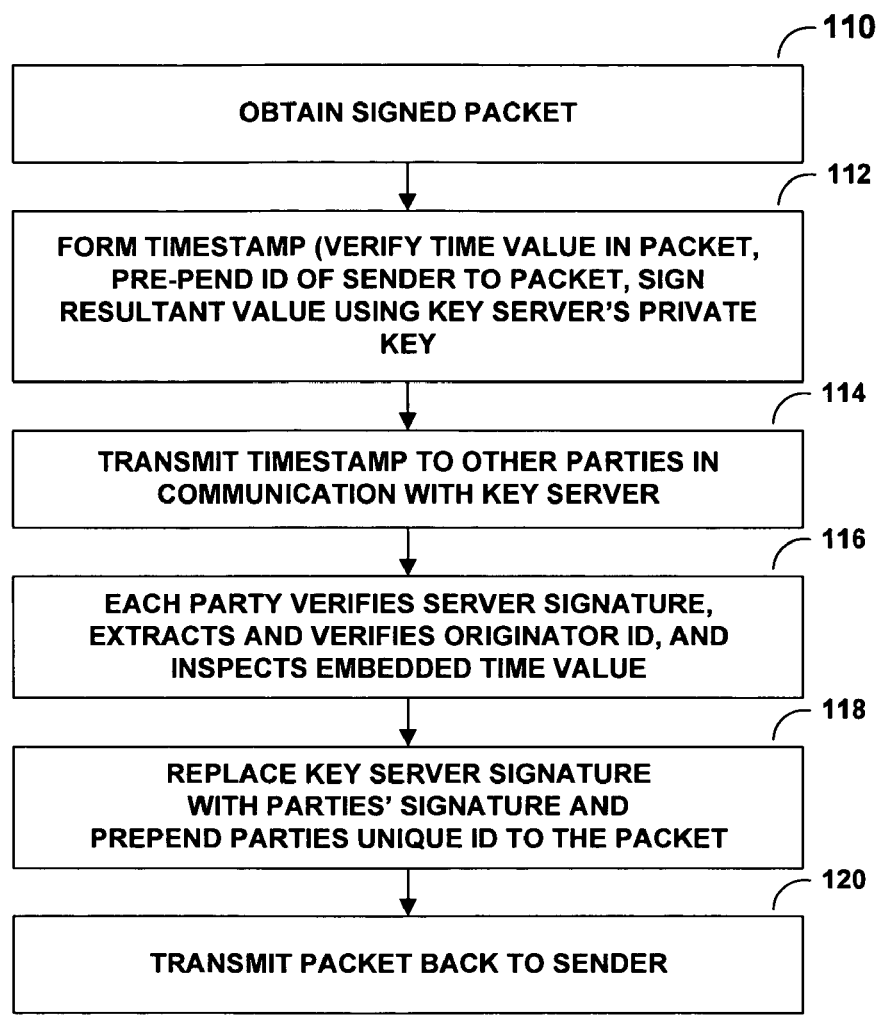
FIG. 5 is a flowchart illustrating exemplary operation of the SETP system for acquiring timestamps and returning timestamps to a sender.
Figure 6:
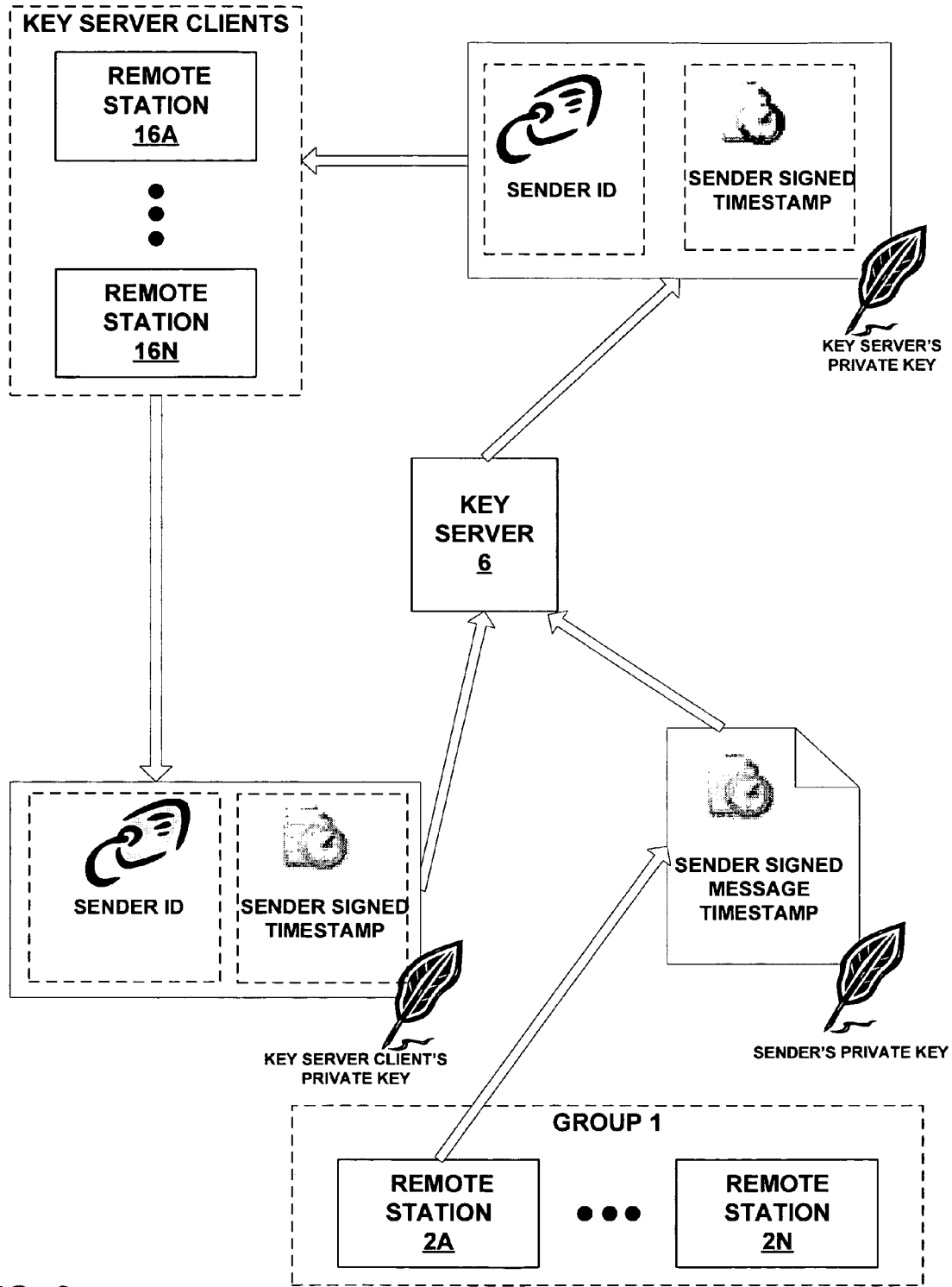
FIG. 6 is a conceptual diagram illustrating the interaction between a key server and key server clients in the SETP system for acquiring timestamps.

FIG. 5 is a flowchart illustrating exemplary operation of system 1 for acquiring timestamps and returning timestamps to a sender. FIG. 6 is a conceptual diagram illustrating the interaction between a key server 6 and key server clients associated with remote stations 16 in the SETP system 1 when acquiring timestamps. FIG. 5 illustrates the functionality depicted in FIG. 6. First, key server 6 (FIG. 1) must obtain a signed packet (110) formed by concatenating the time of message transmission and the message digest over the information to be certified. Next, key server 6 may certify the timestamp (112) by verifying the time value in the packet, pre-pending the identification of the sender to the packet, and signing the hash value using its own private key.

The timestamp may be formatted as simple binary data. Each timestamp may be prefixed by a code, such as "KEYS_CMD_NEXT_TSTMP," to indicate to the client that the following packet is a timestamp. Each timestamp is formatted as simple binary data, and may begin with an ASCII string encoding the certifier's entity identification, followed by a binary value signed using the certifier's private key. The binary value is the original self-signed timestamp transmitted by the sender, appended onto the sender's group identification.

The key server 6 transmits the timestamp to key server clients in communication with the key server (114) at that time. The key server transmits its own timestamp first, and then returns the certified timestamps, one at a time, to the sender. Key server 6 can exploit clients associated with other remote stations 16 connected to the key server in order to provide an added layer of certification. In other words, key server 6 may solicit aid from any client connected to the key server when the key server needs to gather timestamps.

For example, to request that a key server client certify a timestamp, the key server 6 may return a timestamp request, e.g., "KEYS_CMD_TSTMP_REQ" instead of a termination command "KEYS_CMD_QUIT" in response to a client's attempt to end a key session with a KEYS_CMD_QUIT command. Then, if the client accepts the request, e.g., by echoing KEYS_CMD_TSTMP_ACCEPT, the key server 6 sends the timestamp to be stamped along with the certificate of the timestamp's originator, i.e. the sender. This is necessary because the timestamp is formatted as a time value, e.g., 32-bit, followed by a message digest, both of which are signed by the sender of the timestamp.

To certify the stamp, the certifier prepends the entity ID of the originator to the timestamp, signs both items with the certifier's private signature key and then prepends the certifier's entity ID to the signed value. This value is then returned to the key server. However, if the certifier rejects the time value contained in the timestamp, a denial such as "KEYS_CMD_TSTMP_DENY" may be returned to key server 6. The key server may place an upper bound on the number of timestamp requests issued to each client, and any client is free to refuse a request by returning KEYS_CMD_TSTMP_DENY in response to any request.

In order for the communicating parties to certify the timestamp, each party may verify the server's signature, extract the sender's ID, verify the sender's identification, and inspect the embedded time value (116) to ensure that the time value is within a small time margin from the current time. If the previous steps succeed, the key server client may replace the server's signature with its own signature and pre-pend its unique identification to the packet (118).

Importantly the certifier should inspect the time value before signing the timestamp to ensure that the timestamp is recent. Thus, each timestamp is certified by a number of entities (key server clients associated with remote stations 16), rather than a single trusted entity (the key server). Finally, the timestamps are transmitted back to the sender (120) for inclusion in the message being certified or, alternatively, may be stored locally within the key server 6, if appropriate.

Figure 7:
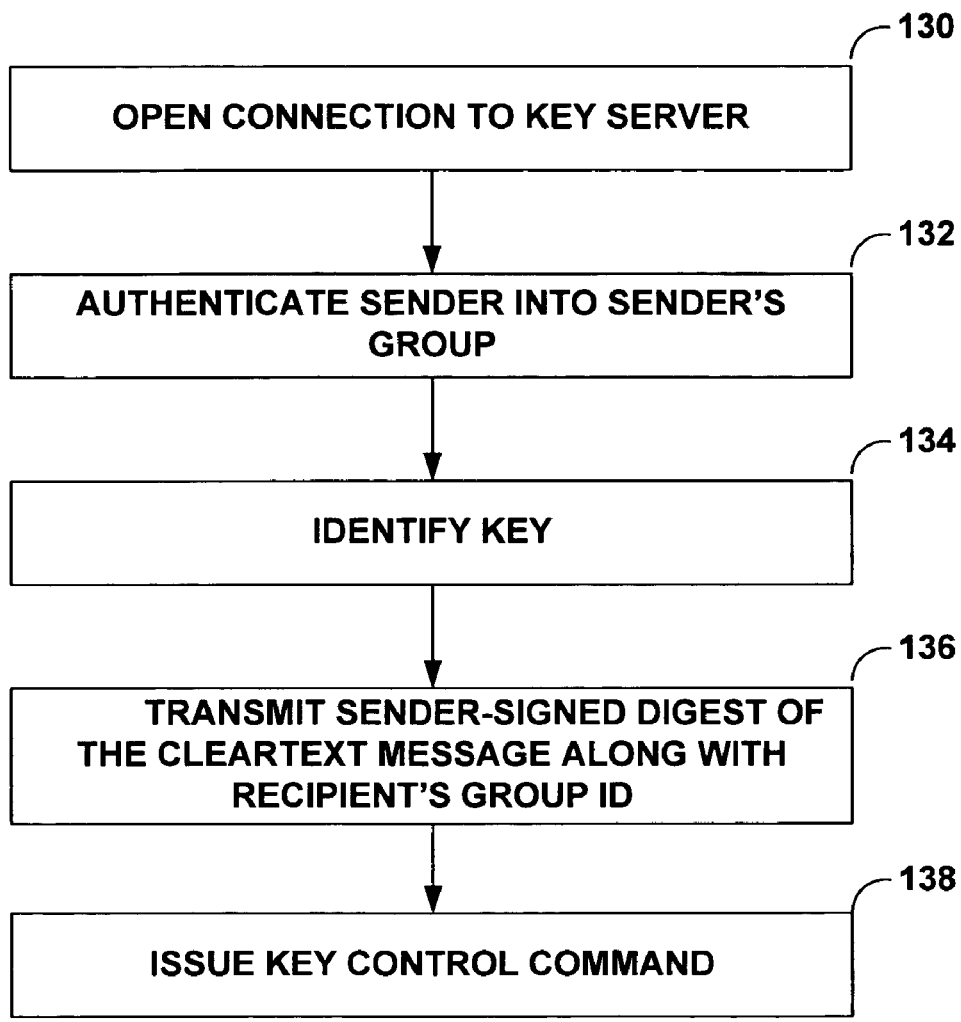
FIG. 7 is a diagram illustrating exemplary operation of the SETP system for controlling the lifetime of a message.

FIG. 7 is a flowchart illustrating exemplary operation of system 1 for controlling the lifetime of a message in further detail. Commands may be issued by the sender to control the lifetime of a message key and check the status of a key. The lifetime of a message key serves to validate the key for a period of time. Once the lifetime assigned to a key expires, the key is no longer valid, and cannot be used to decrypt the applicable message. In this manner, the key management protocol employed by system 1 can be used to control recipient access to messages after they are delivered to a group email server 20. For example, a sender may specify an absolute expiration time at which time the key expires and is no longer valid, or a period of time following message delivery for which the key is valid. In addition, the sender may specify a beginning time at which the key is valid, to prohibit recipient access before a desired time.

Before executing key lifetime control commands, the sender opens a connection to the key server (130) and the sender is authenticated into the sender's group (132) as previously described. Next, the sender identifies the key (134) that is to be managed. For example, the sender may transmit a command, e.g., "KEYS_MNG_WITH_KEY," to set the current key. The sender then transmits the sender-signed digest of the cleartext message along with the recipient's group identity (136). If this information is correctly associated with a key in storage on the server, the key management commands may be executed.

The sender may then issue a key control command (138) to access key control functions, e.g., to check key status or delete a key. As mentioned above, for example, the sender may set the length of the lifetime of a key or an absolute time at which the lifetime of the key begins or ends. By default, the key may be available immediately. In the event that the default is overridden, if a recipient receives a secure message and attempts to open it before the key is available, the key server may inform the recipient that the key is in storage but not yet available. Additionally, key server 6 may inform the recipient when the key will become available so that the recipient can wait and then try to download the key again.

For example, the sender may set the length of the lifetime of a particular key by issuing a key control command, e.g., "KEYS_MNG_LIFE_LEN." If the length is set to zero, the key may promptly be deleted from key server 6. Furthermore, the sender may place a lower absolute bound on key lifetime, e.g., "KEYS_MNG_LIFE_BEGIN," or retrieve either of the two previous values, e.g., KEYS_MNG_GET followed by KEYS_MNG_LIFE_LEN or KEYS_MNG_LIFE_BEGIN. Time specifications may be transmitted as 32bit values. If the key server succeeds in setting a new time value, a reply such as "KEYS_STAT_SUCCESS" is returned; otherwise KEYS_STAT_FAIL is returned to the client to indicate failure, in which case the message will not be delivered. When all operations on the selected key are completed, the command KEYS_CMD_WITHOUT_KEY is issued, to deselect the key.

The sender may query the key server 6 for the status of a symmetric message key to receive notification about the status of a message. Generally, after key server 6 has successfully transferred a symmetric message key to the recipient, the key server generates a key download notification message and transmits the message to the sender to provide message receipt notification. The sender may query the key server to determine the lifetime of a key or if the symmetric message key has been downloaded. This feature may be useful in the event that the sender has lost information associated with the key.

The sender may issue a command, e.g., "KEYS_MNG_RECPT," to determine if a particular key has been downloaded. This command may be especially useful to retrieve the details of the receipt such as its associated timestamps after a receipt notification has been received in the sender's mailbox. The key server 6 may then respond with command KEYS_STAT_RECPT if the key has not been downloaded, or with command KEYS_STAT_SUCCESS if the receipt is available. In the latter case, key server 6 may return the recipient-signed message receipt followed by a 32-bit integer indicating the number of certified timestamps associated with the receipt. Each certified timestamp may then be transmitted to the sender to provide proof-of-delivery.

In any case, the notification message may be formatted as a multipart/signed MIME message and is directed to the sender's group mailbox. The first part of the MIME message may include the cleartext message digest signed using the sender's private key while the second section includes the same cleartext message digest signed using the sender's private key but also preceded by the time of key download and may be signed using the recipient's public key to form a basic receipt and self-signed time stamp. Each sender in the group downloads the message and compares the message digest against the digests of messages previously sent. If a match is discovered, the sender attempts to verify the second digest's signature according to the identity of the intended recipient's group. If they do not match, the key server is at fault for accepting a faulty signature.

Figure 8:
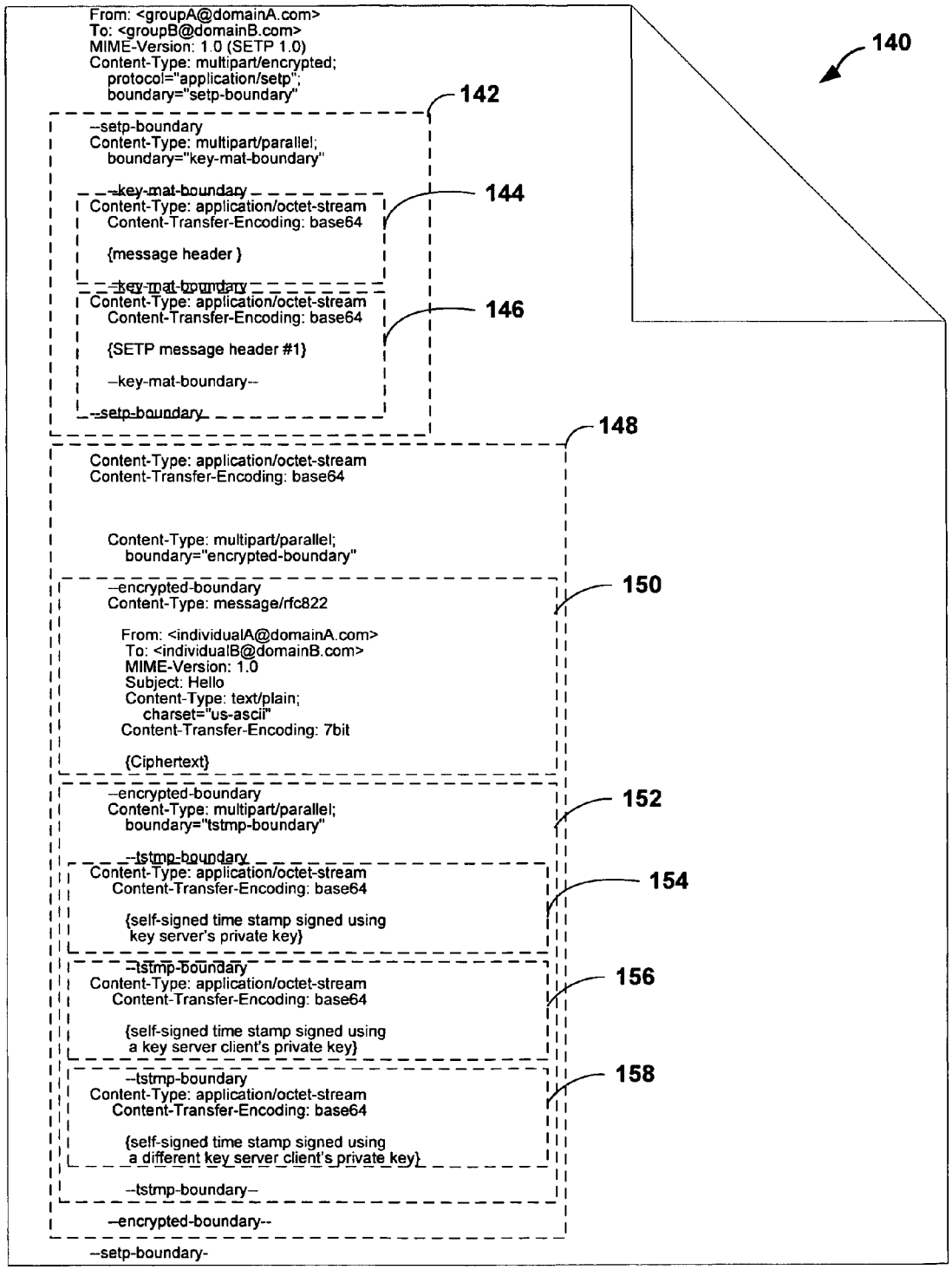
FIG. 8 is screen illustration of an exemplary secure SETP message.

FIG. 8 is screen illustration of an exemplary secure message 140 prepared according to an embodiment of the SETP protocol described herein. In particular, message 140 is illustrated as a message formatted using a variation on the MIME extension as described in the previously mentioned paper authored by J. Galvin et al. Message 140 includes a "From:" field indicating the group address associated with the sender, a "To:" field indicating the group associated with the recipient, a "MIME-Version:" field indicating the format, and a "Content-Type:" field indicating that message 140 has more than one component, the message type, and each component is separated by the string of characters "setp-boundary." Notably, message 140 does not include a field indicating date information.

The rest of message 140 is organized as header 142 and message 148 in accordance with the "Content-Type:" field. As previously described, header 142 is designated for control information needed by the encryption protocol. The "Content-Type:" field of header 142 indicates more than one set of parallel components, each separated by the string of characters "key-mat-boundary." In accordance with the "Content-Type:" field of header 142, the control information needed by the encryption protocol is included in header 144 and 146. Header 144 includes "Content-Type:" field indicating the MIME type "application/octet-stream" and base 64 encoding for the identification of the key server as previously described. Header 146 includes "Content-Type:" field indicating MIME type "application/octet-stream" and base 64 encoding for the cleartext message digest as previously described.

Message 148 includes the ciphertext of message 140 encrypted using the symmetric message key and encoded as specified by the first "Content-Type:" field of message 148. The second "Content-Type:" field of message 148 indicates message 148 includes more than one set of parallel components, each separated by the character string "encrypted-boundary." In particular, message 148 includes the cleartext message 150 and certified time stamps 152. Cleartext message 150 includes "Content-Type:" field indicating the standard RFC822 format, a "From:" field indicating the individual email address of the sender, a "To:" field indicating the individual email address of the recipient, a "MIME-Version:" field indicating the format, a "Subject:" field indicating the subject, and a "Content-Type:" field indicating the data type.

Certified time stamps 152 include a "Content-Type:" field indicating more than one set of parallel components are separated by the character string "tstamp-boundary." In particular, the components include a self-signed time stamp signed using a key server's private key 154, a self-signed time stamp signed using a key server client's private key 156, and a self-signed time stamp signed using a different key server client's private key 158 as described previously.

Figure 9:
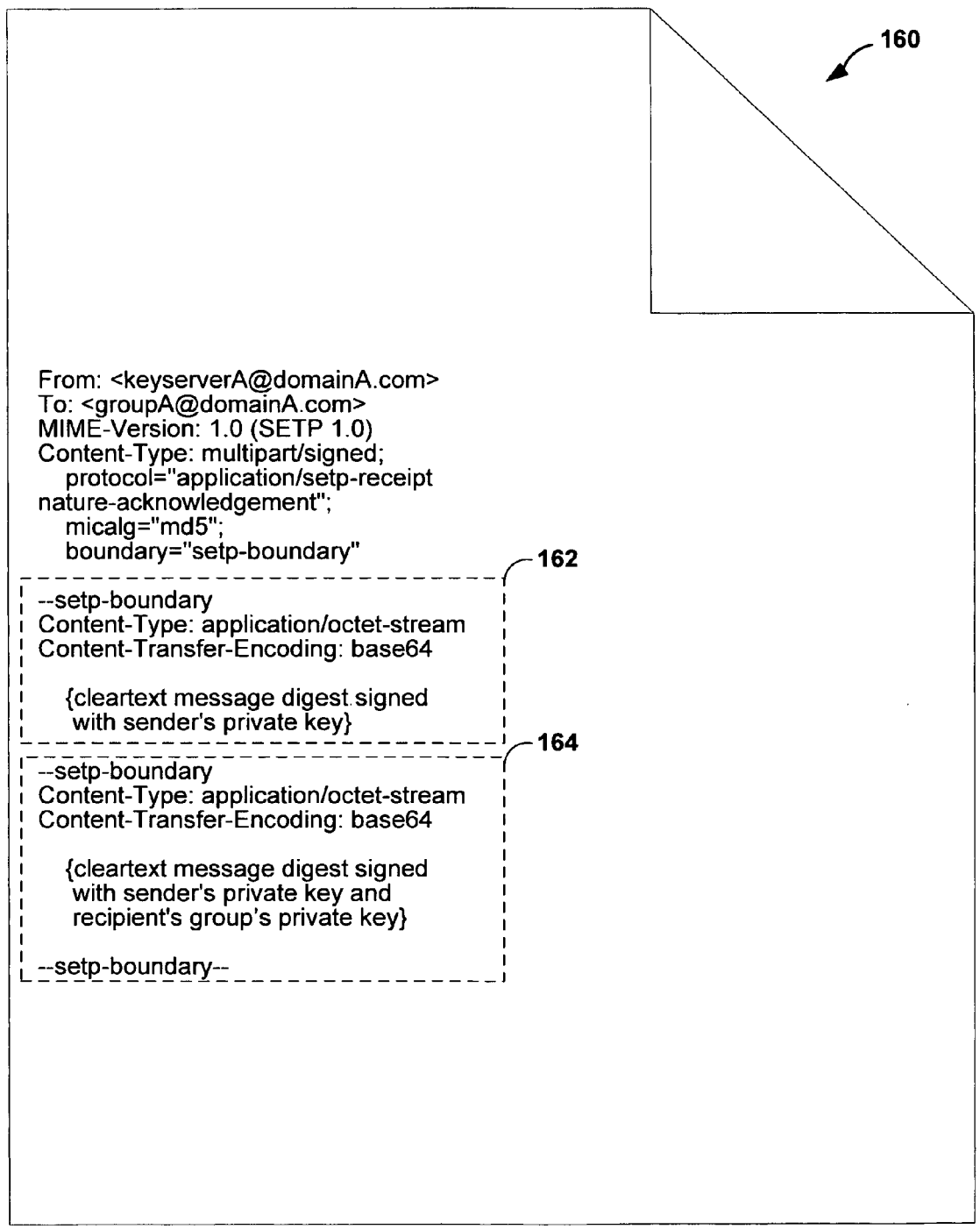
FIG. 9 is a screen illustration of an exemplary SETP message receipt notification.

FIG. 9 is a screen illustration of an exemplary SETP message receipt notification 160 received by the sender of message 140 (FIG. 8). A key server may generate message receipt 160 after successfully transferring the symmetric message key used to encrypt message 140 (FIG. 8) to the recipient. In particular, message receipt 160 is illustrated as a message formatted using the variation on the MIME extension as described in the previously mentioned paper authored by J. Galvin et al. Message receipt 160 includes a "From:" field indicating the identification of the key server, a "To:" field indicating the group associated with the sender recipient, and a "Content-Type:" field indicating that receipt message 160 includes more than one signed component, the message type, the message digest algorithm, and that each component is separated by the string of characters "setp-boundary."

As described previously, message receipt 160 includes the clear text message digest signed using the sender's private key 162 and the same cleartext message digest signed using the sender's private key and the recipient's group private key 164. Cleartext message digest 164 may also include the time that the symmetric message key was downloaded to form a basic receipt and self-signed time stamp.

When the SETP protocol requires symmetric encryption, the Blowfish symmetric encryption algorithm may be used.

For asymmetric encryption and signature generation, the routines available in OpenSSL may be used, along with the RSA encryption algorithm.

The various methods described herein may be implemented by way of instructions carried on a computer-readable medium. Such instructions are formulated to cause a programmable processor to execute the processes described herein. Examples of compute-readable media include random access memory (RAM), read-only memory (ROM), non-volatile random access memory (NVRAM), electrically erasable programmable read-only memory (EEPROM), flash memory, and the like, as well as other fixed or removable computer-readable media such as magnetic, optical, magneto-optical, or holographic tape or disk media.

Various embodiments of the invention have been described. These and other embodiments are within the scope of the following claims.

The invention claimed is:

1. A method comprising:
    encrypting in a client device flow control information associated with an electronic message, the flow control information including identities of a sender and an intended recipient, the encryption using an encryption key unique to the intended recipient;
    transmitting a separately encrypted electronic message with the encrypted flow control information from a client device associated with the sender to a group mailbox server associated with the intended recipient, wherein the group mailbox server receives a plurality of electronic messages for a plurality of different recipients including the intended recipient,
    transmitting to the intended recipient, independently of the transmission of the electronic message, a first decryption key for decrypting the flow control information associated with an electronic message; and
    downloading, by the intended recipient, at least the flow control information of a plurality of messages from said group mailbox server associated with the intended recipient, wherein the messages and encrypted flow control information are retrievable by all members associated with said group mailbox server;
    applying, by the recipient, the first decryption key to the plurality of electronic messages received by the group e-mail server to identify the electronic messages for the intended recipient at least in part according to whether at least a part of the electronic message or the encrypted flow control information can be decrypted by the decryption key; and
    using information from the portion of the electronic message that can be decrypted by the first decryption key to obtain a second decryption key from a key server, the second decryption key used by the recipient of the message to decrypt at least a second portion of the electronic message.

2. The method of claim 1, further comprising transmitting the electronic message with a sender group mailbox server identifier such that the identity of the sender is concealed from the group mailbox server.

3. The method of claim 1, wherein encrypting the flow control information associated with the electronic message comprises encrypting the flow control information with a message key, the method further comprising encrypting content of the electronic message with the message key, wherein transmitting the electronic message comprises transmitting the electronic message with the encrypted flow control information and the encrypted content.

4. The method of claim 3, further comprising:
    transmitting the message key from the client device associated with the sender to a message key server; and
    transmitting an identity of the message key server from the client device associated with the sender to the group mailbox server with the electronic message.

5. The method of claim 4, generating a time stamp in response to receipt of the message key at the message key server, further comprising providing corroboration of the time stamp from one or more clients communicating with the message key server.

6. The method of claim 4, further comprising providing the intended recipient with access to the message key via the message key server, wherein the message key is necessary for decryption of the encrypted flow control information.

7. The method of claim 4, further comprising permitting the sender to invalidate the message key after transmitting the message key to the message key server to prevent the intended recipient from decrypting the encrypted flow control information.

8. The method of claim 7, further comprising permitting the sender to specify a period during which the message key is valid.

9. The method of claim 1, further comprising:
    generating a header;
    encrypting the header using a public key associated with the intended recipient;
    adding the header to the electronic message transmitted from the client device associated with the sender to the group mailbox server; and
    permitting a recipient to accept the electronic message based on successful decryption of the header by the recipient using a private key that corresponds to the public key.

10. The method of claim 9, further comprising transmitting an identity of a message key server from the client device associated with the sender to the group mailbox server with the electronic message, and providing the intended recipient with access to the message key via the key server for decryption of the encrypted flow control information.

11. A system comprising:
    a sender client device that generates an encrypted electronic message, separately encrypts flow control information that includes identities of the sender client device and a recipient client device associated with the electronic message using an encryption key selected according to an intended recipient associated with the recipient client device, and transmits the electronic message with the encrypted flow control information to a group mailbox server associated with multiple recipients, the group mailbox server also selected according to the intended recipient;
    a group mailbox server that receives the electronic message with the encrypted flow control information from the sender client device, wherein the recipient group mailbox server receives a plurality of electronic messages for a plurality of different recipients including the intended recipient;
    a recipient client device that receives at least the encrypted flow control information of a plurality of electronic messages from said group mailbox server, wherein the recipient client device is associated with an intended recipient of the electronic message, applies a decryption key to the downloaded portion of the plurality of messages, and uses information from the portion of the electronic message that can be decrypted by the first decryption key to obtain a second decryption key from a key server, the second decryption key used by the recipient of the message to decrypt at least a second portion of the electronic message;

wherein the messages and encrypted flow control information are retrievable by all members associated with said group mailbox server;

a key server transmitting to the intended recipient, independently of the transmission of the electronic message, a decryption key for decrypting the electronic message; and wherein the recipient client device executes a stored program to download the plurality of electronic messages from the group e-mail server and apply the decryption key to the plurality of electronic messages received by the group e-mail server to identify the electronic message for the intended recipient as an electronic message that can be decrypted by the decryption key.

12. The system of claim 11, wherein the sender client device encrypts content of the electronic message and transmits the message to the recipient group mailbox server via one or more message transport servers.

13. The system of claim 11, wherein the sender client device transmits the message with a sender group mailbox server identifier such that the identity of the sender client device is concealed from the recipient group mailbox server.

14. The system of claim 11, wherein the sender client device encrypts content of the electronic message and the flow control information using a message key.

15. The system of claim 14, further comprising a message key server, wherein the sender client device transmits the message key to the message key server, and wherein the electronic message includes an identity of the message key server.

16. The system of claim 15, wherein the message key server generates a time stamp in response to receipt of the message key, and the message key server obtains corroboration of the time stamp from one or more clients communicating with the message key server.

17. The system of claim 14, wherein the message key is necessary for decryption of the encrypted flow control information, and the message key server provides the recipient client device with access to the message key.

18. The system of claim 17, wherein the message key server permits the sender client device to invalidate the message key after the message key is received by the message key server to prevent the recipient client device from decrypting the encrypted flow control information.

19. The system of claim 17, wherein the message key server permits the sender client device to specify a period during which the message key is valid.

20. The system of claim 11, wherein the sender client device generates a header, encrypts the header using a public key associated with the recipient client device, and adds the header to the electronic message transmitted from the sender client device to the recipient group mailbox server, the recipient client device accesses the electronic message upon successful decryption of the header using a private key that corresponds to the public key, and wherein the electronic message identifies a message key server, and the recipient client device accesses the message key via the identified message key server for decryption of the encrypted flow control information.

* * * * *